(12) United States Patent
Raue et al.

(10) Patent No.: US 11,134,693 B2
(45) Date of Patent: Oct. 5, 2021

(54) TEXTURED POROUS BARRIER TRANSFER CASING

(71) Applicant: Viscofan S.A., Navarra (ES)

(72) Inventors: Frank Raue, Karlsruhe (DE); Jeremey Hinkle, Blue Earth, MN (US)

(73) Assignee: Viscofan S.A., Navarra (ES)

( * ) Notice: Subject to any disclaimer, the term of this patent is extended or adjusted under 35 U.S.C. 154(b) by 382 days.

(21) Appl. No.: 16/055,443

(22) Filed: Aug. 6, 2018

(65) Prior Publication Data

US 2020/0037622 A1 Feb. 6, 2020

(51) Int. Cl.
*A22C 13/00* (2006.01)
*B32B 1/08* (2006.01)
(Continued)

(52) U.S. Cl.
CPC ............ *A22C 13/0013* (2013.01); *B32B 1/08* (2013.01); *B32B 3/26* (2013.01); *B32B 5/20* (2013.01);
(Continued)

(58) Field of Classification Search
CPC ..... B32B 27/327; B32B 27/065; B32B 27/36; B32B 27/308; B32B 27/304; B32B 27/34;
(Continued)

(56) References Cited

U.S. PATENT DOCUMENTS 4,786,512 A   11/1988 Erk
4,883,677 A   11/1989 Aiga et al.
(Continued)

FOREIGN PATENT DOCUMENTS

DE   3526394 C2   10/1987
DE   3741329 C1   3/1989
(Continued)

OTHER PUBLICATIONS

Notice of Allowance for U.S. Appl. No. 16/055,472, dated Apr. 5, 2021, 10 Pages.
(Continued)

*Primary Examiner* — Vera Stulii
(74) *Attorney, Agent, or Firm* — Maine Cernota & Rardin

(57) ABSTRACT

The present invention provides a multi-layered coextruded thermoplastic food casing comprising: at least one thermoplastic porous absorbing layer; and at least one layer having a barrier effect for water vapor and/or oxygen, wherein the at least one layer having a barrier effect for water vapor and/or oxygen has an average layer thickness in a range of from 5 to 60 µm over the entire surface area, wherein the at least one thermoplastic porous absorbing layer comprises as a main component at least one thermoplastic polymer material selected from the group consisting of (co)polyamides and (co)polyolefins, wherein the at least one thermoplastic porous absorbing layer comprises areas having a reduced average layer thickness and areas having a non-reduced average layer thickness, wherein the average layer thickness of the at least one thermoplastic porous absorbing layer in areas having a non-reduced average layer thickness is in a range of from 10 to 200 µm, wherein the average layer thickness in areas having a reduced average layer thickness is lower by 7 to 140 µm and is reduced by a range of from 30 to 85% compared to the areas having a non-reduced average layer thickness of the at least one thermoplastic porous absorbing layer, and wherein both areas having a reduced average layer thickness and a non-reduced average layer thickness comprise pores which are able to absorb a functional additive.

14 Claims, 1 Drawing Sheet

(51) Int. Cl.
| | |
|---|---|
| *B32B 3/26* | (2006.01) |
| *B32B 5/20* | (2006.01) |
| *B32B 7/12* | (2006.01) |
| *B32B 27/06* | (2006.01) |
| *B32B 27/08* | (2006.01) |
| *B32B 27/20* | (2006.01) |
| *B32B 27/30* | (2006.01) |
| *B32B 27/32* | (2006.01) |
| *B32B 27/34* | (2006.01) |
| *B32B 27/36* | (2006.01) |
| *B65D 65/38* | (2006.01) |
| *B65D 85/08* | (2006.01) |
| *B29L 7/00* | (2006.01) |
| *B29L 9/00* | (2006.01) |

(52) U.S. Cl.
CPC ............. *B32B 7/12* (2013.01); *B32B 27/065* (2013.01); *B32B 27/08* (2013.01); *B32B 27/205* (2013.01); *B32B 27/304* (2013.01); *B32B 27/306* (2013.01); *B32B 27/308* (2013.01); *B32B 27/327* (2013.01); *B32B 27/34* (2013.01); *B32B 27/36* (2013.01); *B65D 65/38* (2013.01); *B65D 85/08* (2013.01); *A22C 2013/0023* (2013.01); *A22C 2013/0046* (2013.01); *A22C 2013/0053* (2013.01); *A22C 2013/0059* (2013.01); *B29L 2007/00* (2013.01); *B29L 2009/00* (2013.01); *B32B 2266/025* (2013.01); *B32B 2266/0228* (2013.01); *B32B 2266/0235* (2013.01); *B32B 2266/0257* (2013.01); *B32B 2266/0264* (2013.01); *B32B 2305/026* (2013.01); *B32B 2307/402* (2013.01); *B32B 2307/406* (2013.01); *B32B 2307/728* (2013.01); *B32B 2307/7244* (2013.01); *B32B 2307/7246* (2013.01); *B32B 2439/70* (2013.01)

(58) Field of Classification Search
CPC .... B32B 1/08; B32B 7/12; B32B 5/20; B32B 27/205; B32B 27/306; B32B 3/26; B32B 27/08; B65D 65/38; B65D 85/08; A22C 13/00; A22C 13/0013
See application file for complete search history.

(56) References Cited

U.S. PATENT DOCUMENTS

| | | |
|---|---|---|
| 5,597,606 A | 1/1997 | Kramer et al. |
| 7,615,270 B2 | 11/2009 | Lee et al. |
| 7,666,484 B2 | 2/2010 | Lopez |
| 2006/0003058 A1 | 1/2006 | Koenig et al. |
| 2009/0155328 A1 | 6/2009 | Lee |
| 2009/0214722 A1 | 8/2009 | Henze-Wethkamp et al. |
| 2010/0227164 A1 | 9/2010 | Hihnala et al. |
| 2016/0120195 A1 | 5/2016 | Itoshiro |
| 2017/0267432 A1 | 9/2017 | Chen |
| 2020/0037623 A1* | 2/2020 | Raue ............... A22C 13/00 |

FOREIGN PATENT DOCUMENTS

| | | |
|---|---|---|
| DE | 10124581 A1 | 11/2002 |
| EP | 0738471 A2 | 10/1996 |
| EP | 0992194 A1 | 4/2000 |
| EP | 1164856 A1 | 1/2002 |
| EP | 1192864 A2 | 4/2002 |
| EP | 1556285 A1 | 4/2004 |
| EP | 1911352 A1 | 4/2008 |
| EP | 1955596 B1 | 8/2008 |
| EP | 2478772 A1 | 7/2012 |
| EP | 3014997 A1 | 5/2016 |

OTHER PUBLICATIONS

Office Action for U.S. Appl. No. 16/055,472, dated Jun. 30, 2020, 6 Pages.
Office Action for U.S. Appl. No. 16/055,472, dated Oct. 28, 2020, 14 Pages.

* cited by examiner

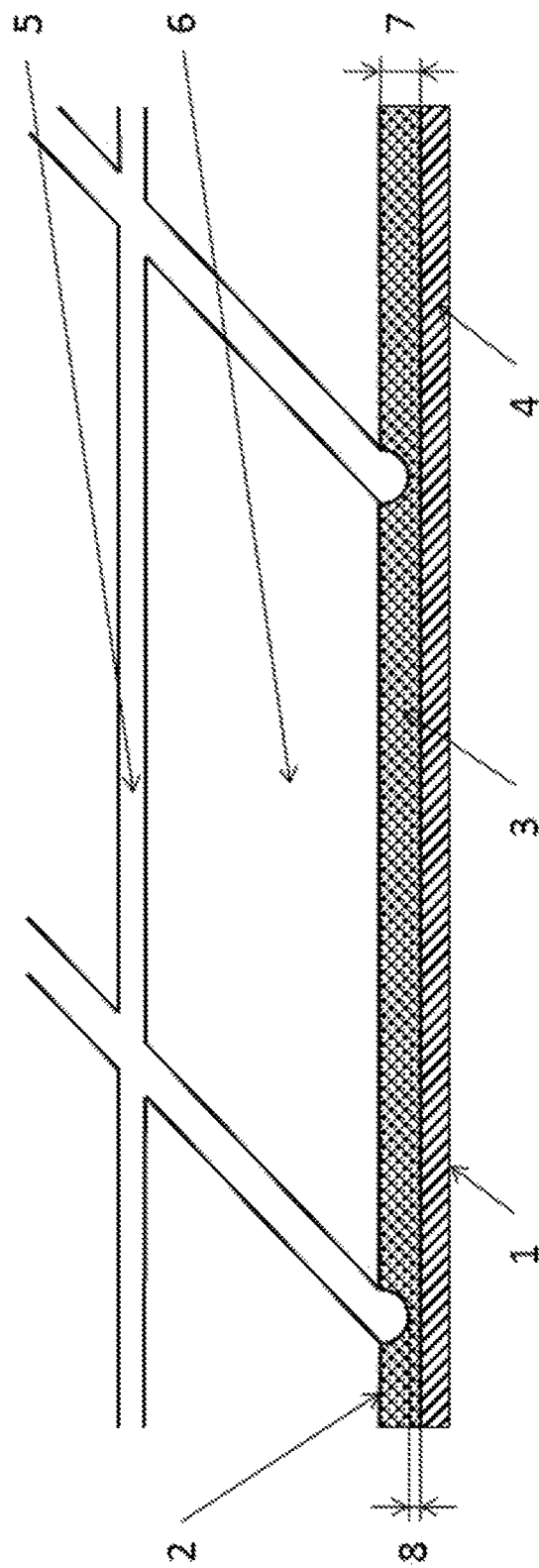

TEXTURED POROUS BARRIER TRANSFER CASING

TECHNICAL FIELD OF THE INVENTION

The present invention relates to a multi-layered coextruded thermoplastic food casing comprising at least one thermoplastic porous absorbing layer comprising areas having a non-reduced average layer thickness and areas having a reduced average layer thickness, a method for producing said multi-layered coextruded thermoplastic food casing and use of said multi-layered coextruded thermoplastic food casing for example as a sausage casing, which food casings are able to transfer functional food additives such as flavors or colors onto the enclosed foodstuff, especially in the production of meat, cheese or fish products.

BACKGROUND ART OF THE INVENTION

In the production of meat products, smoke treatment has a long tradition for taste and preservation reasons. In said tradition the smoking of the products in smoking rooms or chambers is widely used. However, in such a case the casings need to be permeable for the smoke, which means that the casing has a low water vapor barrier so that the meat product can lose weight during cooking and storage. To avoid weight loss during storage a secondary packaging may become necessary. However, smoke deposits on the walls and the ceiling of the smoking rooms can affect the appearance of meat products in the following cooking cycle. To avoid these drawbacks of a smoke treatment through a smoke-permeable casing, the inside of casings, which offer a sufficient barrier to water vapor, has been coated or impregnated with liquid smoke, but also with color solutions, e.g. solution on a caramel basis, or seasonings.

A special category of often smoke-treated meat products are products which are stuffed into a net and cooked with the net on, stabilizing and shaping the product and giving the final product a textured appearance on its surface. The final product is then sold packaged in a secondary package with the net on the product or—for the convenience of the consumer—with the net already stripped off at the producer. Even when the product is sold in slices, the slices still show on the circumference a textured variation in color and—depending on the degree of overstuffing the net—a more or less pronounced waviness of the circumference, resulting from the meat product bulging through the meshes of the net. The variation in color is coming from the contact of the net with the product, so that in this contact pattern the access for smoke to the surface of the product is reduced.

Nettings are available in different shapes, sizes and smoke colors. The woven nets can be found e.g. as casing net, stockinette and elastic net. The net is usually a seamless net stocking or a tube comprising meshes with polygonal, circular or oval forms, and comprises fibers selected from the group consisting of cotton, linen, viscose, polyamide, polyester, polyolefin, cellulose and elastomers. U.S. Pat. No. 4,883,677 discloses PVDC as the net material. The patterns and variations in string-type offered are marketed with names such as square or cube, diamond, smooth, rib, ripple, spiral or hex.

Often a net alone would not hold the meat product in place sufficiently, or the net would adhere to the meat product in such a way, that the surface of the meat product is damaged when the net is peeled off, leading to unappealing appearance of the final product. Therefore, before stuffing or even during stuffing the meat product into the net, the meat product (such as a ham) is typically encased in a wrapping, which may be edible if made from collagen, modified cellulose or carrageenan, or inedible if made from fibrous or plastic casings, cellophane or paper. If the wrapping is only an unsealed film, the net prevents the film from opening.

An example of a fiber-reinforced film for use with a net is disclosed in US 2010/0227164. Said film provides elasticity, permeability and resistance properties of the film comprising a paper-reinforced alginate film containing polyhydric alcohol, the film having peelability without residues and offering after removal an optionally smoked food product with a clearly visible net-like pattern thereon. However, the usage of this film—as any permeable wrapping—suffers from the above mentioned disadvantages of weight loss during cooking and storage without secondary packaging.

To provide a packaging system that allows to perform this stuffing process in a conventional stuffing machine, U.S. Pat. No. 7,666,484 discloses a film, curved onto itself along a longitudinal axis to form a cylinder, in which the longitudinal side edges are overlapping to a certain extent in direct contact with each other but not otherwise connected, shirred or wrinkled in the manner of an accordion, that can have an internal support in the form of a tube of a stiff material, and which can be externally coated by a separation sheet and an also shirred tubular net. However, any usage of a combination of net and casing is expensive and therefore only applied for highly valued products. Another problem when developing a new meat item with a woven net casing (whether fixed or elastic netting) is the difficulty how to consistently obtain the required "net weight".

Regarding the combination of a net with a casing, WO 2007/090934 teaches the production of a composite shirred casing, comprising the steps of pulling an outer casing over the inner casing, and optionally a net between the inner and outer casings, or over the outer casing, and finally shirring the composite casing thus obtaining a compact tube, which is cut to yield sticks. The outer casing may be formed of a multilayer plastic casing, while the inner casing may be a fibrous casing. Using two casings, further increases the costs of the netted product.

DE 37 41 329 discloses a sausage casing made at least partially of thermoplastic material, where the entire circumference of the casing shows outwardly bulging deformations, which may be spherical in shape and regularly spaced. Essential for the sausage casing described in DE 37 41 329 is that the casing is enclosed by an elastic net, whose mashes allow the deformations to penetrate when the casing is stuffed. By providing an elastic net on the outside of the casing, pressure is enacted on the casing so that formation of bubbles inside the sausage can be avoided. The deformations need to be embossed into the thermoplastic flat sheet, which then can be e.g. sewn together to a tubular casing. An air-permeable embodiment is envisioned to be suitable for dried sausages.

To avoid the usage of a net without losing the net-like appearance of the final product, EP 2 478 772 A discloses a casing being a tube-shaped knitted stockinette made of a single type of yarn (e.g. polyester fibers), wherein the stockinette comprises zones of condensed stitches. The condensed stitches can adhere to each other by heat deformation, which in addition may shrink the zones of the condensed stitches. To obtain these zones, which have a reduced elasticity, the knitted stockinette is selectively heated by pressing the flattened knitted stockinette between two heated molds, each provided with a corresponding e.g. net-like pattern.

To obtain a simulated netted surface appearance without actually using a net and to retain the product juices within the cooked product, U.S. Pat. No. 5,597,606 recommends forming a cooking cavity from a heat shrinkable film, filling the cavity with meat product, closing the product-filled cavity with another heat shrinkable material, cooking the formed meat product package, and thereafter removing the package so that the three dimensional meat product surface is retained and the juices are contained within the finished product. In a following step the product could then be e.g. smoked or colored, and finally resealed for resale. The mold, which forms the film into the cooking cavity, has a simulated net retaining surface interior. The interior topology of the mold shall be mirrored by the film, in which afterwards the meat emulsion is cooked, receiving the shape of the film. Main disadvantages of this process are the additional step for applying taste or color and the shape of the final product, which is not typical for the net application the final product shall resemble.

All of the above cited teachings make use of permeable structures and/or flat films, which need to be sealed by using one or more than one casing and/or flat film, in order to produce a net-cooked meat product or a meat product having an appearance of having been net-cooked.

For a transfer of functional additives like liquid smoke or caramel solutions onto foodstuff, several casing structures have been described. As inner layers of the casing, some of these structures use hydrophilic materials, which allow the absorbance of the functional additive into the material. For example inner layers comprising starch were used. Other structures use as an inner layer a layer made of cellulose which will come into contact with the foodstuff. In such a case, however, absorption of the liquid into the paper or cellulose is observed. In case of a flat film, alternatively the desired functional additive can be sprayed, printed or scraped onto the surface. In order to achieve a sufficient fixation, a drying step usually has to be carried out before the flat film is formed into a tube and sealed. Upon transfer of the functional additive onto the meat, the seal will be visible as a longitudinal line of different color in longitudinal direction of the peeled food product.

The carrier film of these structures can be a fibrous layer, the major disadvantage of which is a low water vapor barrier effect. During a cooking process or storage of the product, the foodstuff loses part of its water content thus reducing the yield. For this reason plastic coated fibrous casings and laminates comprising an outer plastic film and an inner paper or cellulose film have been developed.

EP 0 992 194 A discloses a casing that consists of an impermeable film with a joined inner lining consisting of fibers made of cotton or cellulose, or woven, non-woven or knitted fabric, which is then impregnated and sealed to a tube or bag.

Another example of a food casing which is capable of transferring food additives is described in US 2006/0003058 A, which teaches an at least two-layered tubular food casing comprising an inner layer formed of a thermoplastic organic polymer embedding a powdery organic filler such as starch. The casings described in these two documents combine the absorbance capacity of a material forming the inner layer and the barrier properties provided by the outer (multi-layer) plastic films. However, such casings are disadvantageous, because a multi-step production process for preparing such coated or laminated casing structures is needed and/or a possible mold growth on the inner starch, cellulose or paper layer and breaking problems during cooking may occur.

U.S. Pat. No. 7,615,270 B2 discloses casings comprising an inner layer made of hydrophilic materials, such as e.g. block-copolyether ester or block-copolyether amide. Such casings suffer from the disadvantage that their absorbance capacity for liquid substances is limited. In many applications, such an absorbance capacity is insufficient in order to provide the desired effect onto the foodstuff. Furthermore, if liquid substance remains on the casing surface, a non-uniform, unpredictable distribution and formation of droplets upon opening of the tubular casing is likely and the transfer onto the foodstuff shows a marble-like, non-uniform coloration of the foodstuff.

DE 101 24 581 A teaches a food casing wherein liquid smoke is sprayed into the casing during shirring. As it takes a storage time of at least 5 days for the liquid smoke to migrate into the casing, the storage costs and the "time-to-customer" is high.

In general, the outer side of a casing is easily accessible for printing, coating and impregnation. But, in the case of tubular barrier films the casing needs to be turned inside out so that the treated surface will come into contact with the foodstuff. EP 1 192 864 A teaches a step of coating or impregnating the outer side of a casing which is stuffed into the bore of the strand so that it can be turned inside out during stuffing. Thus prior to a stuffing of the strand the treated outside surface of the casing can be contaminated during handling processes. Another drawback is that when the treatment (coating/impregnation) is carried out by using a printing process, the edges are printed twice, which leaves two longitudinal lines of higher intensity on the foodstuff after peeling off the casing.

In order to increase the absorbance capacity of the thermoplastic inner layer, formation of pores in that inner layer is desirable. Inner layers formed of a thermoplastic material as disclosed in EP 1 164 856 B1 show a network of interconnected interstices. Said inner layers are made from a food grade thermoplastic polymer with the interstices being formed by a non-supercritical liquid pore-forming agent, which polymer optionally further comprising an inorganic filler.

EP 1 911 352 A1 and US 2009/214722 A1 disclose multi-layered coextruded stretched thermoplastic food casings comprising at least one porous inner layer, comprising at least one plastic material and at least one filler and at least one pore-forming component of an oily pore-forming agent. The porosity of the porous inner layer has an interconnected porosity such that said innermost porous inner layer is able to absorb, retain, desorb and to transfer at least one transferable functional additive from the porous inner layer to food encased in said casing. The casings further comprise at least one layer having a barrier effect for water vapor, in the case of US 2009/214722 A1 for water and/or oxygen.

EP 3 014 997 A1 describes a multi-layered oriented barrier casing, whose inner layer has a porosity generated by (co)extruding a first polymer composition comprising a polymer and a supercritical pore-forming agent. The porosity allows absorbing, retaining, desorbing and transferring at least one transferable functional additive from said at least one porous inner layer to food encased in said casing.

All of the above described casings, which are capable of absorbing a high amount of transferable substance into the layer body by means of hydrophilic components or pores, intend to homogeneously transfer the contained substance to the enclosed foodstuff. They are not able to transfer a pattern onto the foodstuff surface, or to generate a textured surface, or to produce a food product comprising an outside surface which resembles as having been in contact with a net during its production. Even if the to be transferred substance is printed in a pattern onto a flat film or onto the outside of a tubular casing, a textured surface of the final product is not obtained and the above mentioned disadvantages of sealing and/or reversing, render a printing step unfavorable.

EP 0 738 471 A2 discloses a cellulose casing for stuffing meat products, being of the kind comprising a tubular body of indefinite length designed to receive the meat emulsion during the stuffing stage and to be eliminated after the subsequent smoking, cooking and/or coloring stage, characterized by being partially and continuously or discontinuously coated with a proofing substance providing a barrier to the passage of external smokes and/or colorings and/or pigments to define a color contrast on the surface of the meat product, once such smokes or colorings have been applied and after the removal of the cellulose casing.

EP 1 955 596 A2 discloses a process of obtaining smoked food products with marks, characterized in that it comprises the following steps:
   printing proofing marks to water and smoke on the entire film or on a part thereof,
   coating the food product with at least the printed part of the film,
   intense drying of the food product and film at a relative moisture of less than 25%,
   smoking the food product and film under the same moisture conditions so as to obtain areas on the food product surface in correspondence with the position of the marks with a darker smoked color than that obtained on the rest of the surface.

Both EP 0 738 471 A2 and EP 1 955 596 A2 use a process of smoking the enclosed food product to create an image on the surface of the food product. Therefore the casings need to be water vapor permeable, which results in weight loss during the cooking step and the following storage.

In DE 35 26 394 a casing for raw sausages is described, which is made of a longitudinally sealed polyamide-based binder-free non-woven fibrous web. The non-woven fibrous web is subjected to a partial compression treatment in order to create rectangular compressed areas and non-compressed bars located in-between. As a consequence of the compression treatment, at least the non-compressed bars of the grid formed remain permeable. The non-woven fibrous web is not able to absorb and retain a functional additive in the non-woven fibrous web (so as to prevent the functional additive from travelling to the outside) and then transfer absorbed food additives onto the enclosed foodstuff.

WO 2005/110713 A1 describes the uniform stretching of flat film to achieve more uniform gauge thickness and improved mechanical properties. The method involves extruding the thermoplastic extrudate in the form of a web in its molten state and locating differential speed rollers to chill the film to its solid state and stretching the film between the rollers to achieve a stretched film having substantially uniform gauge. The porosity of the film is created by stretching a layer or film, whose material comprises pore-forming particles. The microporous film surface can be printed or provide nice hand feel. The chill roller may comprise an embossing metal roller to create cloth-like surfaces, matt finish or other textures. However, the embossed geometry can only be relatively small in dimensions as otherwise the stretching, especially by using intermeshing rollers, results in a non-uniform stretching. Thus, the embossing takes place before the stretching step, which creates the micro-porosity.

EP 1 556 285 B1 discloses adhesive food wraps formed of an embossed web material having embossed protrusions and valleys there between wherein the valleys comprise an adhesive to which a second material can be adhered. Said second material can be selected from the group consisting of antimicrobial protection, food preservation, atmosphere modification, odor elimination, product spoilage indication, nutrition and dietary benefits, flavor enhancement, moisture absorption, enhancing microwave cooking, heating, cooling, product insulation, and combinations thereof.

Therefore, the object to be solved by the present invention is to provide a multi-layered coextruded thermoplastic food casing having a high strength, homogenous shirring and de-shirring ability, and excellent capability of transferring food additives to the enclosed foodstuff, wherein said thermoplastic food casing is able to transfer a design showing a stable contrast and good durability on the foodstuff which can be formed of food additive(s) transferred to the enclosed food, e.g. logos, marks, any artistic design or a net-like pattern.

Further, it is an object of the present invention to provide a process for preparing such an improved multi-layered coextruded food casing.

Furthermore, an object of the present invention is the use of the casing as a wrapping for meat and other foodstuff products.

SUMMARY OF THE INVENTION

According to the invention, there is provided a multi-layered (co)extruded thermoplastic food casing comprising: at least one thermoplastic porous absorbing layer and at least one layer having a barrier effect for water vapor and/or oxygen,
   wherein the at least one layer having a barrier effect for water vapor and/or oxygen has an average layer thickness in a range of from 5 to 60 µm over the entire surface area, wherein the at least one thermoplastic porous absorbing layer comprises as a main component at least one thermoplastic polymer material selected from the group consisting of (co)polyamides and (co)polyolefins, wherein the at least one thermoplastic porous absorbing layer comprises areas having a reduced average layer thickness and areas having a non-reduced average layer thickness, wherein the average layer thickness of the at least one thermoplastic porous absorbing layer in areas having a non-reduced average layer thickness is in a range of from 10 to 200 µm, wherein the average layer thickness in areas having a reduced average layer thickness is lower by 7 to 140 µm and is reduced by a range of from 30 to 85% compared to the areas having a non-reduced average layer thickness of the at least one thermoplastic porous absorbing layer, and wherein both areas having a reduced average layer thickness and a non-reduced average layer thickness comprise pores which are able to absorb a functional additive.

In a preferred embodiment the multi-layered (co)extruded thermoplastic food casing comprises at least one thermoplastic porous absorbing layer which comprises a (co)polyolefin as a main component, the thermoplastic porous absorbing layer further comprising at least 5 weight-% of a (co)polyamide based on the weight of the thermoplastic polymer material used for forming the at least one thermoplastic porous absorbing layer (not including other additives such as pore-forming agents or functional additives). The present inventors have found that if the at least one thermoplastic porous absorbing layer comprises a (co)polyolefin as a main component and at least 5 weight-% of a (co)polyamide, the properties of the multi-layered (co)extruded thermoplastic food casing for example with respect to adhesion of the food enclosed in the casing can be improved.

A multi-layered (co)extruded thermoplastic food casing according to the present invention as defined above may generate on a surface of a foodstuff—when enclosed in the food casing—a pattern which is formed by a functional additive transferred onto the foodstuff.

The term "multi-layered (co)extruded thermoplastic food casing" comprises tubular casings, which have been coextruded by means of an annular die, and flat films or cut-open tubular casings, which are sealed to form a tubular casing, and bags made thereof. In a preferred embodiment the multi-layered (co)extruded thermoplastic food casing is a seamless tubular multi-layered coextruded thermoplastic food casing.

According to the present invention the at least one layer having a barrier effect for water vapor and/or oxygen and optionally other non-porous layers—if present—may also be named as "bulk layers".

The term "porous absorbing layer" comprises absorbing layers which comprise areas having a reduced average layer thickness and areas having a non-reduced average layer thickness, wherein the areas having a reduced average layer thickness and the areas having a non-reduced average layer thickness show different porosity levels over the inside surface of the casing or may show larger pores in parts of the entire inside surface and smaller pores in other parts of the at least one porous absorbing layer.

The term "absorb" comprises absorbing and/or adsorbing of a functional additive into and/or onto said at least one porous absorbing layer at room temperature (25° C.) and atmospheric pressure (1 bar).

The term "having a water vapor barrier effect" according to the present invention means that the coextruded thermoplastic food casing shows a water vapor transmission rate of 0.01 to 500 $g/m^2d$, preferably 0.1 to 100 $g/m^2d$, more preferably 1 to 20 $g/m^2d$, even more preferably 1 to 10 $g/m^2d$ at 23° C. and 85% relative humidity according to ASTM E398-03.

The term "having an oxygen barrier effect" according to the present invention means that the coextruded thermoplastic food casing shows an oxygen transmission rate through the food casing of the present invention of 30 $cm^3/(m^2\,d\,bar)$ or less, preferably of less than 20 $cm^3/(m^2\,d\,bar)$, often in the range of 6 to 12 $cm^3/(m^2\,d\,bar)$, sometimes of about 0.1 or about 1 to less than 6 $cm^3/(m^2\,d\,bar)$ when tested according to DIN 53380-3 at 23° C. and 50% relative humidity.

The term "a main component of said at least one thermoplastic porous absorbing layer" according to the present invention means that at least one thermoplastic polymer material selected from the group consisting of (co)polyamides and (co)polyolefins, is present in said at least one thermoplastic porous absorbing layer in a weight ratio of at least 55 weight-%, preferably at least 70 weight-%, more preferably at least 80 weight-%, even more preferably at least 90 weight-%, most preferably in a range of from 90 to 95 weight-% based on the weight of the thermoplastic polymer material used for forming said at least one thermoplastic porous absorbing layer (not including other additives such as pore-forming agents or functional additives).

According to the present invention it was found that the areas having a reduced average layer thickness and the areas having a non-reduced average layer thickness of the at least one thermoplastic porous absorbing layer have a different retaining capacity for a functional additive to be transferred to the food enclosed by the food casing. According to the present invention the term "retaining capacity" defines a capability of the areas having a reduced or a non-reduced average layer thickness of the at least one thermoplastic porous absorbing layer to absorb and/or adsorb a functional additive into and/or onto said areas of the at least one porous absorbing layer at room temperature (25° C.) and atmospheric pressure (1 bar). According to the present invention the parameter "retaining capacity ratio" of the areas having a reduced or a non-reduced average layer thickness of the at least one thermoplastic porous absorbing layer is expressed by a ratio of the layer thickness of the at least one thermoplastic porous absorbing layer in the respective area divided by the layer thickness of the at least one bulk layer at the same location. In the food casing claimed according to the present invention the "retaining capacity" usually decreases with a decreasing layer thickness of areas having a reduced average layer thickness of the at least one porous absorbing layer when subjecting said areas of the at least one thermoplastic porous absorbing layer to an embossing treatment according to the present invention. The "retaining capacity" of areas having a reduced average layer thickness of the at least one thermoplastic porous absorbing layer usually increases when subjecting the at least one thermoplastic porous absorbing layer to a thermoforming treatment according to the present invention. In such a case the average layer thickness of the at least one non-porous layer is reduced dependent on the draw ratio applied, while the average layer thickness of the at least one porous absorbing layer in the corresponding areas is reduced to a smaller extent, if the same draw ratio is applied, because the pores in said areas become larger, thus not reducing the average layer thickness of the at least one porous absorbing layer in said areas to the same extent as in the at least one non-porous layer.

According to the present invention the areas having a reduced average layer thickness are usually formed by applying a mechanical and/or thermal treatment to areas of the at least one porous absorbing layer.

Furthermore, the term "mechanical and/or thermal treatment" according to the present invention for example comprises an "embossing" and/or "thermoforming" treatment.

The term "embossing" according to the present invention refers to a process step with which an average layer thickness of the at least one porous absorbing layer is reduced by locally applying a thermal and optionally mechanical treatment to the surface of the at least one porous absorbing layer so as to bring the at least one porous layer in a thermoplastic state. In order to generate areas having a reduced average layer thickness by embossing, semi-crystalline polymers need to be at temperatures around its melting temperature or above. An embossing treatment according to the present invention can be carried out without any actual physical contact with the at least one porous absorbing layer, which is to be deformed. A thermal treatment, e.g. by an appropriate laser, can have sufficient energy to "emboss" or form the desired texture into the at least one porous absorbing layer, especially when the casing is an oriented casing and the porosity had been at least partially generated by stretching, provided that pores which are able to absorb a functional additive, remain in the areas having a reduced average layer thickness.

The term "thermoforming" according to the present invention refers to a process step with which an average wall thickness of specific areas of the thermoplastic food casing is reduced while said thermoplastic food casing is in a viscoelastic state. In order to achieve a reduction of an average layer thickness without fusing all the pores the thermoplastic material of said at least one porous absorbing layer needs to be at temperatures above the glass transition temperature, but below the melting temperature. When carrying-out a thermoforming step, the layer thickness in the thermoformed areas is reduced in contrast to the non-thermoformed areas.

The term "draw ratio" according to the present invention refers to the ratio of the surface area of a thermoformed area after thermoforming in relation to the surface area of the same area before thermoforming. If according to the present invention an "embossing" step is carried out, the draw ratio of the embossing step is equal to 1.

According to the present invention during formation of areas having a reduced average layer thickness in the at least one thermoplastic porous absorbing layer, the average layer thickness of the non-porous bulk layers is only reduced in relation to the draw ratio applied to said areas (i.e. in embossed areas the average layer thickness of the non-porous bulk layers is not changed).

The terms "reversing" and "inverting" according to the present invention refer to a process of turning the casing inside out so that the outside surface becomes the inside or food contact surface of the casing after the reversing or inverting step.

According to the present invention the areas having a non-reduced layer thickness of the at least one porous absorbing layer can be determined by marking areas of highest thickness of said at least one porous absorbing layer by means of carbon paper (e.g. Plenticopy 200 H by Pelikan Group GmbH), which is attached to a flat glass plate by means of double-sided adhesive tape, and moving across the flattened surface of the at least one porous absorbing layer. Thereafter, within an area of at least 10 cm$^2$ of the food casing to be analyzed the layer thickness of said at least one porous absorbing layer is measured in at least 10 locations in marked (by means of said carbon paper) areas having a non-reduced layer thickness of said at least one porous absorbing layer and in at least 10 locations in unmarked areas having a reduced layer thickness of said at least one porous absorbing layer (wherein the 10 lowest thickness values measured must be used) by using a thickness gauge or by using SEM microscopy, as described below.

As outlined above, according to the present invention it was surprisingly found that a retaining capacity for a functional additive such as liquid smoke in areas having a reduced average layer thickness clearly differs from a retaining capacity for said functional additive in areas having a non-reduced average layer thickness of the at least one porous absorbing layer so that these areas will transfer different amounts of such a functional additive onto the enclosed foodstuff in said different areas. Furthermore, it was found that if the average layer thickness in said areas having a reduced average layer thickness is reduced by a range of from 30 to 85% and by 7 to 140 µm compared to said areas having a non-reduced average layer thickness, both areas will be able to transfer functional additive such as liquid smoke onto the enclosed foodstuff in such a way that a visually verifiable and visually acceptable contrast in the amount of functional additive being transferred can be achieved and at the same time it can be avoided that the amount of functional additive absorbed/adsorbed desorbs or diffuses before being transferred onto the foodstuff. If, however, the average layer thickness in said areas having a reduced average layer thickness is reduced by less than 30% and/or less than 7 µm compared to said areas having a non-reduced average layer thickness, the difference in the amount of functional additive being transferred is too low in order to achieve a visually verifiable contrast on the foodstuff produced. If, on the other side, the average layer thickness in said areas having a reduced average layer thickness is reduced by more than 85% and/or more than 140 µm compared to said areas having a non-reduced average layer thickness, functional additive cannot be retained so as to later on transfer the functional additive onto the surface of the foodstuff to be treated (for example when said areas are formed in a thermal treatment such as thermoforming), or the meat cling properties of the porous layer can be deteriorated (for example in the areas of reduced layer thickness when carrying-out an embossing treatment).

The average layer thickness of said at least one thermoplastic porous absorbing layer of the food casing according to the present invention may also be determined by measuring the total thickness of the casing (as outlined above at least at 10 locations) and subtracting the bulk layer(s) thickness analyzed under the microscope as described below.

Surprisingly, according to the present invention it was found that if the average layer thickness of said at least one porous absorbing layer in said areas having a reduced average layer thickness is reduced by a range of from 7 to 140 µm compared to said areas having a non-reduced average layer thickness, more preferable by 7 to 120 µm, even more preferably by 8 to 90 µm, even more preferably by 8 to 60 µm, even more preferably by 15 to 60 µm, most preferably by 20 to 40 µm, areas having a reduced layer thickness provide an average layer thickness which is small enough so as to clearly differ from the amount of functional additive which can be adsorbed and/or absorbed by the surrounding areas having a non-reduced layer thickness, and furthermore form a pattern of areas which creates a visually verifiable contrast in the transferred amount of the functional additive onto the foodstuff between areas of high and areas of low retaining capacity.

In a preferred embodiment of said multi-layered coextruded thermoplastic food casing, the multi-layered coextruded thermoplastic food casing is seamless and tubular.

In a further preferred embodiment of said multi-layered coextruded thermoplastic food casing according to the present invention it was found that if the average layer thickness of said at least one porous absorbing layer in said areas having a reduced average layer thickness is reduced by a range of from 30 to 80%, preferably 35 to 75%, more preferably 55 to 70% compared to said areas having a non-reduced average layer thickness, both areas will be able to transfer functional additive such as liquid smoke onto the enclosed foodstuff in such a way that a visually verifiable contrast in the amount of functional additive being transferred can be determined.

In a further preferred embodiment of said multi-layered coextruded thermoplastic food casing the average layer thickness of the at least one thermoplastic porous absorbing layer is not limited to only 2 levels (reduced and non-reduced), but also involves areas of intermediate average layer thickness so as to create intermediate color shades on the enclosed foodstuff. An intermediate average layer thickness can for example be generated by locally applying an embossing treatment at a given embossing temperature for different embossing times in to-be-embossed areas of said at least one porous absorbing layer, or by locally applying an embossing treatment at different embossing temperatures for the same embossing times in to-be-embossed areas of said at least one porous absorbing layer, or by applying locally different draw ratios in thermoformed areas of said at least one porous absorbing layer.

In a further preferred embodiment of said multi-layered coextruded thermoplastic food casing, the difference in the average layer thickness between areas having a reduced layer thickness and areas having a non-reduced layer thickness of said at least one thermoplastic porous absorbing layer gives rise to the transfer of a net-like pattern on the enclosed foodstuff.

In a further preferred embodiment of said multi-layered coextruded thermoplastic food casing, the difference in the average layer thickness between areas having a reduced layer thickness and areas having a non-reduced layer thickness of said at least one thermoplastic porous absorbing layer gives rise to the transfer of a logo pattern on the enclosed foodstuff.

In a further preferred embodiment of said multi-layered coextruded thermoplastic food casing, the difference in the average layer thickness between areas having a reduced layer thickness and areas having a non-reduced layer thickness of said at least one thermoplastic porous absorbing layer gives rise to the transfer of a pattern on the enclosed foodstuff, resembling a "naturally" inhomogeneous coloring of the surface consisting of areas or pixels of different darkness.

In a further preferred embodiment of said multi-layered coextruded thermoplastic food casing the difference in the average layer thickness between areas having a reduced layer thickness and areas having a non-reduced layer thickness of said at least one thermoplastic porous absorbing layer gives rise to the transfer of a net-like pattern showing visible "bulges" typical for a sausage cooked in a net.

During stuffing the at least one thermoplastic porous absorbing layer is present on the inside of the multi-layered coextruded thermoplastic food casing, while the at least one further layer having a barrier effect for water vapor and/or oxygen forms (an) outer layer(s) of the food casing. More than one thermoplastic porous absorbing layer can be present in the multi-layered thermoplastic food casing according to the present invention so that they can jointly provide areas of different average layer thicknesses and, thus, retaining capacities of the casing.

The present invention further provides a method for producing a multi-layered (co)extruded thermoplastic food casing as defined above, comprising a step of subjecting the multi-layered (co)extruded thermoplastic food casing to at least one mechanical and/or thermal treatment so as to create on the inside surface of said at least one thermoplastic porous absorbing layer areas having a reduced average layer thickness and areas having a non-reduced average layer thickness as defined above.

In a preferred embodiment the present invention provides a method for producing a multi-layered (co)extruded thermoplastic food casing as defined above, comprising a step of subjecting the at least one thermoplastic porous absorbing layer of the multi-layered (co)extruded thermoplastic food casing to a—with respect to the at least one thermoplastic porous absorbing layer—contactless heating via the outer layer. This includes heating up the porous layer for example by using a laser, infrared rays or hot air, or by e.g. heated materials actually physically touching the non-porous outer layer. Surprisingly, said different areas as defined above can be generated without damaging the outer layer(s) or causing cracks or breakages during stuffing or cooking the stuffed casing.

In an alternative embodiment the present invention provides a method for producing a multi-layered (co)extruded thermoplastic food casing as defined above, comprising a step of subjecting the multi-layered (co)extruded thermoplastic food casing to at least one mechanical and/or thermal treatment so to create on the outside surface of said at least one thermoplastic porous absorbing layer areas having a reduced average layer thickness and areas having a non-reduced average layer thickness, then coating said outside surface of said at least one thermoplastic porous absorbing layer with a functional additive, followed by an optional drying step and a subsequent reversing step of turning the casing inside out.

In a further alternative embodiment the present invention provides a method for producing a (co)extruded thermoplastic food casing as defined above, comprising a step of subjecting the multi-layered (co)extruded thermoplastic food casing to a mechanical and/or thermal treatment so as to create on its outside surface areas having a reduced average layer thickness and areas having a non-reduced average layer thickness, a subsequent reversing step of turning the casing inside out, and a subsequent further step of subjecting the coextruded casing to a further mechanical and/or thermal treatment so as to stably form on its inside surface areas having a reduced average layer thickness and areas having a non-reduced average layer thickness as defined above.

In a preferred embodiment the method for producing a multi-layered (co)extruded thermoplastic food casing comprises a thermoforming step so as to provide the enclosed foodstuff on its surface with a three-dimensional pattern wherein said multi-layered (co)extruded food casing does not comprise a net on its outside surface.

A person skilled in the art is well aware of several different reversing techniques, including a technique of reversing a shirred stick during stuffing.

Impregnation with a functional additive can be done by spraying or bathing while the food-contact-surface is still on the outside. In this case an optional step of drying and/or curing the functional additive to immobilize the functional additive on the surface can be carried out. As an alternative to coating the food-contact surface present on the outside of the casing, the casing can be reversed after a mechanical and/or thermal treatment of the outside surface. When the food-contact-surface is at least one inner layer, it can be impregnated by use of internal coating techniques like "moving bubble" between 2 pairs of nip reels or inside spraying e.g. during shirring.

The step of subjecting the (co)extruded casing to a mechanical and/or thermal treatment comprises a step in which the layer thickness of areas of said at least one porous absorbing layer is reduced by subjecting areas on the surface of the at least one thermoplastic porous absorbing layer to an embossing and/or thermoforming step. Preferably the process of embossing is carried out by heating these areas to temperatures above the glass transition temperature (see page 11), for example to a temperature which is 5 to 25° C. lower than the melting temperature of the thermoplastic material of the at least one thermoplastic porous absorbing layer. The heating can be carried out by contact methods (e.g. ultrasonic embossing) or non-contact methods (e.g. by laser). The heating can be carried out from the opposite side of the casing, as long as at least one of the outer layers has a high enough melting temperature to withstand the heating without melting. If the embossing temperature is below about 5° C. below the melting temperature of the at least one thermoplastic porous absorbing layer, contact methods allowing for a mechanical treatment of the casing are needed so as to sufficiently reduce the thickness of the at least one thermoplastic porous absorbing layer. Embossing temperatures above the Vicat softening temperature of the at least one thermoplastic porous absorbing layer are highly preferred so as to achieve a stable reduction of the layer thickness of the at least one thermoplastic porous absorbing layer.

According to the present invention the difference in the melting temperature of the material of the at least one porous absorbing inner layer and the melting temperature of the at least one layer having a barrier effect for water vapor and/or oxygen, when the melting temperatures are measured according to DIN EN ISO 11357-3, should be larger than 30° C., preferably larger than 40° C., more preferably larger than 50° C., most preferably more than 60° C.

Optionally the step of subjecting the (co)extruded casing to a mechanical and/or thermal treatment further comprises a step of subjecting the multi-layered (co)extruded thermoplastic food casing to a thermoforming process, e.g. by a corrugator, so that bulges are formed, which allow the final product to obtain a shape resembling e.g. a product which was cooked in a net. By carrying out such a thermoforming step, in the areas treated the size of the pores present in the at least one thermoplastic porous absorbing layer of said multi-layered (co)extruded thermoplastic food casing can be increased so as to further enhance the retaining capacity of the pores in said areas.

The method for producing a multi-layered (co)extruded thermoplastic food casing optionally further comprises a step of subjecting the multi-layered (co)extruded thermoplastic food casing to a mono-axial or bi-axial orientation treatment prior to a step of forming at least one thermoplastic porous absorbing layer comprising areas having a reduced average layer thickness and areas having a non-reduced average layer thickness. By carrying out such an orientation step the size of the pores present in the at least one thermoplastic porous absorbing layer of said multi-layered (co)extruded thermoplastic food casing can be increased. If at the time of thermoforming the food casing already had been subjected to a mono-axial or bi-axial orientation treatment, the orientation degree must have been low enough to further allow local orientation to the desired extent.

Furthermore, by subjecting said multi-layered (co)extruded thermoplastic food casing to a mono-axial or bi-axial orientation treatment, e.g. in a double- or triple-bubble process, the strength of the casing structure can be further increased so that wrinkle-free and caliber consistent food casings can be produced. Preferably the oriented casing should be annealed to have low or no shrinkage in order to avoid shrinking in subsequent thermal treatment steps, such as e.g. drying of an outside coating. This is especially important when a thermal treatment step should be combined with an orientation step, because released shrinkage will cause the film or tubular casing to wrinkle, which makes it difficult to handle the casing in subsequent steps. For example, the precise positioning of the casing in a thermoforming tool may be difficult if the casing shrunk during a prior embossing step for generating at least one thermoplastic porous absorbing layer comprising areas having a reduced average layer thickness and areas having a non-reduced average layer thickness.

Furthermore, in a preferred embodiment of the present invention the polymer composition which forms the at least one thermoplastic porous absorbing layer of the multi-layered coextruded thermoplastic food casing is a polymer composition further comprising at least one hydrophilic component and/or at least one pore-forming agent and optionally a filler and/or optionally a nucleating agent.

As according to the present invention the multi-layered food casing is a thermoplastic food casing, disadvantages due to lamination with organic substances can be avoided and, thus, mold growth risks due to organic substances such as paper, cellulose or starch can be prevented. If in a preferred embodiment the multi-layered thermoplastic food casing is a seamless multi-layered coextruded thermoplastic food casing, said tubular multi-layered coextruded thermoplastic food casing does not comprise any weakening seam or seal, so that an exact formation of the porosity pattern comprising areas of high retaining capacity for a functional additive and areas of low retaining capacity for a functional additive can be achieved.

According to the present invention it was surprisingly found that by subjecting the multi-layered (co)extruded thermoplastic food casing to a mechanical and/or thermal treatment, on the surface of the at least one thermoplastic porous absorbing layer areas having a reduced average layer thickness and areas having a non-reduced average layer thickness can be formed.

Contrary to the food casings known in the art, the retaining capacity of the at least one porous absorbing layer of the food casing according to the present invention is locally different so that a pattern such as a logo or picture or net of different retaining capacity can be formed on said at least one thermoplastic porous absorbing layer which pattern, after loading the functional additive into/onto the inside surface of the at least one thermoplastic porous absorbing layer, can be transferred onto the foodstuff.

The at least one layer having a barrier effect for water vapor and/or oxygen, when having a barrier effect for water vapor in the food casing according to the present invention, assures a sufficient barrier effect so that the to-be-transferred functional additives do not readily diffuse to the outside of the casing, preventing contamination of the environment and machinery during handling and processing. Furthermore, by using a food casing comprising at least one thermoplastic porous absorbing layer as defined according to the present invention weight loss during cooking and storage can be greatly decreased in comparison to conventional casings made of fibers, cellulose or collagen.

Furthermore, with respect to the at least one layer having a barrier effect for water vapor and/or oxygen, when having a barrier effect for water vapor, the water vapor transmission rate of said at least one layer having a barrier effect for water vapor of the food casing according to the present invention can be adjusted in such a way that some drying of the foodstuff's surface still can take place during drying phases of the cooking cycle.

Also an oxygen barrier effect of the at least one layer having a barrier effect for water vapor and/or oxygen can be adjusted via adjusting the composition of said at least one layer. In addition to polyvinylidenchloride or polyethylene vinyl alcohol, for example blends of polyamide and polyethylene vinyl alcohol or polyamide resins having a barrier effect for oxygen such as polyamide resins produced through polycondensation of meta-xylylene diamine (MXDA) with adipic acid (e.g. Nylon-MXD6® from Mitsubishi Gas Chemical Company) can be used so as to form at least one layer having a barrier effect for water vapor and/or oxygen.

BRIEF DESCRIPTION OF THE FIGURE

FIG. 1 represents a preferred embodiment of an embossed food casing (1) according to the present invention comprising porous layer(s) (3) and bulk layer(s) (4), the porous layer(s) comprising on the food contact side (2) areas having a lower retaining capacity ratio (5) and areas having a higher retaining capacity ratio (6), wherein the embossed areas having a lower retaining capacity ratio have a reduced porous layer thickness (8) and the areas having a higher retaining capacity ratio have a non-reduced porous layer thickness (7).

DETAILED DESCRIPTION

A food casing according to the invention may be used as a packaging for any type of food including but not limited to meat products, sausage products, milk products, cheese products and dishes, unprocessed or processed—especially to meat containing products like fermented sausages, cooked-meat sausage (Kochwurst), scalded emulsion sausage (Brühwurst) like frankfurters, cooked ham (Kochschinken), ham, pickled meat, smoked turkey breast and salt meat (Pökelware), vegetables, dairy products like cheese, carbohydrates, soybean products as well as different mixtures or in any desired application. The food casings according to the present invention may be used in any desired form such as in the form of "endless" tubes, sections, rings such as sausage rings, customized products such as shirred sticks or bags, and the food casing according to the present invention can be empty, stuffed and further processed if desired.

Food is often processed, i.e. cooked in a plastic film package, for example by at least partially immersing the package in hot water or placing the package in a steam cabinet. The processed food package may then be refrigerated until the processed food is prepared for a meal or is to be consumed, or it is peeled and further packaged after portioning into pieces or slices. During the cooking process e.g. of meat, for example, smoke or other modifiers for color, flavor or fragrance diffuse into the food material. The diffusion process takes longer if taking place at ambient temperatures only, e.g. during a fermenting process or storage.

Transferable Functional Additives

The at least one transferable functional additive may be, for example one or more of colorants such as caramel or paprika extract, flavorants such as glutamates, fragrances such as terpenoids and/or any other desired food additives. Many transferable functional additives can be effective as different (such as two or three) types of transferable functional additives selected from the group of colorants, flavorants and fragrances. For example liquid smoke functions as a colorant, a flavorant as well as a fragrance.

A colorant, flavorant, fragrance and/or any other additive or any combination thereof may be applied—in one of the possible embodiments—to the casing in any desired way e.g. in a tube containing the liquid, dispersed, dissolved or in any combination. The transferable functional additive can be in a liquid mass which may preferably be distributed with the aid of a liquid bubble such that the additive may be moved or distributed or both. In such a way, the content of the transferable functional additive may be directly applied to a coextruded and optionally stretched casing. The transferable functional additive may be applied in its commercially available condition—preferably in a liquid form, especially in a dissolved form, dispersed form or in a dissolved and dispersed form, e.g. in water—or in a modified condition. More preferred, the functional additive is present in dissolved form in water. It is typically applied onto the food-contact surface of the casing, which is the outside surface of the innermost of the at least one porous absorbing layer e.g. by dipping, flooding, spraying or even by squeezing of the tube containing the liquid mass. This can be effected e.g. with the aid of squeezing rollers and distributing the liquid at least partially on the surface of the inner layer of the casing e.g. with the aid of such squeezing rollers. Preferably at least one of these compounds or a mixture containing at least one of these compounds—preferably in a liquid form—may be absorbed, charged, distributed, incorporated, injected, applied as a film or coating or in any combination thereof onto/in/into a film or food contact surface of the casing. It is especially desirable that the additive(s) are provided onto/in/into the at least one porous absorbing inside surface or onto/in/into parts of the at least one porous absorbing inner layer of the multi-layered coextruded thermoplastic food casing e.g. by the effect of capillary forces. The transfer of these compounds/mixtures from the at least one porous absorbing inner layer of the food casing to the food may occur via their interface. This is particularly the case if the multi-layered coextruded thermoplastic food casing is formed of non-polar polymers such as (co)polyolefins. If the colorant, the flavorant, the fragrance and/or any other additive is polar in nature, the transmission of such compound(s) may sometimes be nearly complete or perhaps even complete, if the non-polar surface had been coated with the polar functional additive.

In case the at least one porous absorbing layer is not an inner layer of a tubular casing (i.e. it is the outer layer of a tubular casing, which will need reversing later on, or a surface of a flat film), in addition to dipping, flooding, spraying or showering, the application of the at least one transferable functional additive can also take place via a printing process. Also, if there are two or more transferable functional additives, they can be applied independently of one another so that mixed patterns and/or a mixture of functional additives such as tastes can be transferred. For example, spices can be applied only on areas of low retaining capacity or on areas of high retaining capacity. The adhesion of the functional additive to the casings surface can be increased by applying plasma or corona treatment to the casings surface prior to coating the casing with the functional additive, in the case of a particulate functional additive, such as spices or herbs, by usage of binders.

Preferably, this corona discharge treatment is conducted in such a way that after the corona discharge treatment the wetting tension of the innermost layer surface is 35 mN/m or higher, preferably 40 mN/m or higher, and more preferably 50 to 60 mN/m, as measured by testing inks according to DIN ISO 8296 for the determination of the wetting tension of plastic films. The conditions of the corona discharge are not limited and may be suitably determined according to the type, thickness and feeding rate of the casing to be processed. As the porosity influences the wetting tension to be provided, the setting of the parameters of the corona treatment device should be done with a casing having a non-porous inner layer having the same polymer composition as the composition of the porous inner layer used according to the invention.

The fluid or liquid of the at least one transferable functional additive is preferably absorbed/adsorbed by pores contained in the at least one thermoplastic porous absorbing inner layer. A casing according to the present invention preferably has at least one thermoplastic porous absorbing inner layer, but it is preferred in several embodiments that most of or all the other layers of the casing have low, nearly no or no porosity at all. It is preferred that at least one of the other layers shows high strength. If a casing has at least one non-porous layer having a barrier effect for water vapor and/or oxygen and at least one thermoplastic absorbing porous inner layer, casings which are able to transfer a functional additive to the enclosed foodstuff can be formed. Such casings have sufficient strength, flexibility and/or barrier effect for water vapor or gases like oxygen gas or both.
The at Least One Porous Absorbing Layer The at least one porous absorbing layer comprising areas having a reduced average layer thickness and areas having a non-reduced average layer thickness comprises areas of high retaining capacity for a functional additive and areas of low retaining capacity for a functional additive. Typically, at least one porous absorbing layer is designed to absorb/adsorb and therefore to immobilize the at least one transferable functional additive. The additive can be in liquid form and after it is immobilized, it can be desorbed, mobilized and transferred to food it is in contact with. A dominating mechanism can be adhering or bonding of the additive to the surface, with only some absorption into the at least one porous absorbing layer. The immobilization of the at least one transferable functional additive can be enhanced via drying and/or curing.

In one embodiment the food casing according to the present invention typically comprises at least one thermoplastic porous layer serving as the at least one absorbing inner layer. Alternatively two, three or four or more porous inner layers may form a group of porous inner layers, of which one is the innermost porous layer whose surface is adjacent to the encased foodstuff.

In another embodiment the food casing according to the present invention comprises at least one porous absorbing layer serving as the absorbing outer layer, when it is extruded. If such a preparation process is used, the casing needs to be reversed at some point in the process in order to prepare a multi-layered coextruded thermoplastic food casing according to the present invention which can be subjected to a food stuffing step.

The at least one thermoplastic porous absorbing layer comprises as a main component at least one thermoplastic polymer material selected from the group consisting of (co)polyamides and (co)polyolefins, Examples of said (co)polyamides and/or (co)polyolefins are:

(Co-)Polyamides, such as homo-, co- or ter-polyamides, preferably aliphatic (co-)polyamides, partially aromatic (co-)polyamides;

polyolefins, preferably polyethylenes, polypropylenes or copolymers based on e.g. ethylene, propylene, or other -olefins, poly(iso)butene or any mixture thereof.

In many embodiments, the multi-layered coextruded thermoplastic food casing contains more than one thermoplastic organic polymer components. Often there are two or three, and sometimes even more than three different thermoplastic polymers or even at least two different thermoplastic polymers which differ in at least one chemical group contained therein.

Thus, the at least one thermoplastic porous absorbing layer may further comprise the following components:

vinyl copolymers like ethylene vinyl acetate copolymers, polyvinyl alcohols, ethylene vinyl alcohol copolymers (EVOH) or any combination thereof, which optionally is partially or totally saponified, such as ethylene vinyl alcohol copolymers; polyvinylpyrrolidone, polystyrene, polyvinylchloride, polyvinylfluoride or any combination thereof;

vinylidenechloride (co-)polymers (PVDC), e.g. copolymers of vinylidene chloride with comonomer(s) such as vinyl chloride or (meth)acrylate;

(co-)polyesters of aliphatic, (partially) aromatic or aliphatic and aromatic character e.g. polylactide, polycaprolactone, polycarbonate or (co-)polymers of aliphatic diols with aliphatic or aromatic dicarboxylic acid(s) such as terephthalate(s), such as poly(butylenes glycol terephthalate): specifically polyhydroxyalkanoates or polylactic acids.

In one preferred embodiment of the present invention polyolefins can be used as thermoplastic organic polymers, such as homopolymers of ethylene or propylene and/or copolymers of linear alpha-olefins with 2 to 8 C-atoms, preferably linear low density polyethylene, low density polyethylene, high density polyethylene, homo-polypropylene, block-polypropylene and random copolymers of propylene. In an even more preferred embodiment low density and linear low density polyethylene can be used.

In another preferred embodiment of the present invention polyamides can be used as thermoplastic organic polymers, such as homo-, co- or ter-polyamides which can be produced from the corresponding monomers such as caprolactam, laurolactam, omegaaminoundecan acid, adipic acid, azelaic acid, sebacic acid, decandicarbonic acid, dodecandicarbonic acid, terephthalic acid, isophthalic acid, tetramethylendiamine, pentamethylendiamine, hexamethylendiamine, octamethylendiamine and xylylendiamine. Preferred polyamides to be used according to the present invention are homo- and co-polyamides such as polyamide 6, polyamide 12, polyamide 66, polyamide 610, polyamide 612, polyamide MXD6, polyamide 6/66, polyamide 66/6, polyamide 6/12 and polyamide 6I/6T. In an even more preferred embodiment polyamide 6 and polyamide 6/66 can be used.

Furthermore, the thermoplastic organic polymer(s) to be used according to the present invention to form the at least one thermoplastic porous absorbing layer, may comprise additional hydrophilic components such as a polyetherester copolymer, polyvinylalcohol, polyesterblockamide, copolyetheresteramide or block copolymer polyether amide, or polyvinylpyrrolidone so as to facilitate the water vapor transmission through or into the matrix of the at least one thermoplastic porous absorbing layer, thus helping to immobilize the functional additive after coating.

According to the present invention said at least one thermoplastic porous absorbing layer comprises as a main component at least one thermoplastic material selected from the group consisting of (co)polyamides and (co)polyolefins, which is present in said at least one thermoplastic porous absorbing layer in a weight ratio of at least 55 weight-%, preferably at least 70 weight-%, more preferably at least 80 weight-%, even more preferably at least 90 weight-%, most preferably 90 to 95 weight-% based on the weight of the thermoplastic polymer material used for forming said at least one thermoplastic porous absorbing layer (not including other additives such as pore-forming agents or functional additives).

Furthermore, in a preferred embodiment said multi-layered (co)extruded thermoplastic food casing comprises at least one thermoplastic porous absorbing layer which comprises a (co)polyolefin as a main component, said thermoplastic porous absorbing layer further comprising at least 5 weight-% of a (co)polyamide based on the weight of the thermoplastic polymer material used for forming said at least one thermoplastic porous absorbing layer (not including other additives such as pore-forming agents or functional additives).

The at least one thermoplastic porous absorbing layer usually has—in total—an average layer thickness of 10 to 200 µm, preferably 15 to 150 µm, more preferably 15 to 130 µm, more preferably 20 to 120 µm. The layer thickness depends on the desired retaining capacity and the number of layers available to achieve the desired retaining capacity.

According to the present invention it was surprisingly found that a retaining capacity for a functional additive such as liquid smoke in areas having a reduced average layer thickness clearly differs from a retaining capacity for said functional additive in areas having a non-reduced average layer thickness of the at least one porous absorbing layer so that these areas will transfer different amounts of such a functional additive onto the enclosed foodstuff in said different areas. Furthermore, it was found that if the average layer thickness in said areas having a reduced average layer thickness is reduced by a range of from 30 to 85% and by 7 to 140 µm compared to said areas having a non-reduced average layer thickness, both areas will be able to transfer functional additive such as liquid smoke onto the enclosed foodstuff in such a way that a visually verifiable contrast in the amount of functional additive being transferred can be achieved and at the same time the amount of functional additive absorbed/adsorbed does not desorb or diffuse before being transferred onto the foodstuff. If, however, the average layer thickness in said areas having a reduced average layer thickness is reduced by less than 30% and/or less than 7 µm compared to said areas having a non-reduced average layer thickness, the difference in the amount of functional additive being transferred is too low in order to achieve a visually verifiable contrast on the foodstuff produced. If, on the other side, the average layer thickness in said areas having a reduced average layer thickness is reduced by more than 85% and/or more than 140 µm compared to said areas having a non-reduced average layer thickness, functional additive cannot be retained so as to later on transfer the functional additive onto the surface of the foodstuff to be treated (for example when said areas are formed in a thermal treatment such as thermoforming), or the meat cling properties of the porous layer can be deteriorated (for example in the areas of reduced layer thickness when carrying-out an embossing treatment).

Surprisingly, according to the present invention it was found that if the average layer thickness of said at least one porous absorbing layer in said areas having a reduced average layer thickness is reduced by a range of from 7 to 140 µm compared to said areas having a non-reduced average layer thickness, more preferable by 7 to 120 µm, even more preferably by 8 to 90 µm, even more preferably by 8 to 60 µm, even more preferably by 15 to 60 µm, most preferably by 20 to 40 µm, areas having a reduced layer thickness provide an average layer thickness which is small enough so as to clearly differ from the amount of functional additive which can be adsorbed and/or absorbed by the surrounding areas having a non-reduced layer thickness, and furthermore form a pattern of areas which creates a visually verifiable contrast in the transferred amount of the functional additive onto the foodstuff between areas of high and areas of low retaining capacity.

In a further preferred embodiment of said multi-layered coextruded thermoplastic food casing according to the present invention it was found that if the average layer thickness of said at least one porous absorbing layer in said areas having a reduced average layer thickness is reduced by a range of from 30 to 80%, preferably 35 to 75%, more preferably 55 to 70% compared to said areas having a non-reduced average layer thickness, both areas will be able to transfer functional additive such as liquid smoke onto the enclosed foodstuff in such a way that a visually verifiable contrast in the amount of functional additive being transferred can be determined.

The average layer thickness of said at least one thermoplastic porous absorbing layer of the food casing according to the present invention may also be determined by measuring the total thickness of the casing (as outlined above at least in 10 locations) and subtracting the bulk layer(s) thickness analyzed under the microscope as described below.

According to the present invention the surfaces of the hollow spaces and channels of the porosity of said at least one porous absorbing inner layer are able to absorb/adsorb a transferable functional additive, to store it and, subsequently, to release and to transfer it. In other words, when the functional additive stored in the at least one porous absorbing inner layer comes in direct contact to the foodstuff when foodstuff is encased in the casing, the at least one functional additive is transferred to the foodstuff.

According to a preferred embodiment of the present invention the porous structure of the at least one thermoplastic porous absorbing layer is created by a supercritical pore-forming agent introduced into the molten polymer or polymer mixture in the extruder designated to form the at least one thermoplastic porous absorbing layer in such a way that a solution is being generated. In contrast, in most of the food casings known in the art the hollow spaces (porous structure) or interstices of the at least one porous absorbing layer are formed by using non-supercritical liquid pore-forming agents such as hydrophobic oils or oily substances.

One benefit of using a supercritical pore-forming agent is that no pore-forming agent will remain in the at least one porous inner layer after extrusion of the polymer mixture.

Any of a wide variety of supercritical pore-forming agents such as supercritical nitrogen, supercritical oxygen, supercritical helium or supercritical carbon dioxide, more preferably supercritical carbon dioxide or supercritical nitrogen, even more preferably supercritical nitrogen may be used as the supercritical pore-forming agent to be used according to the present invention. Said supercritical pore-forming agent is introduced into the extruder and mixed with at least one first polymer (for forming the at least one thermoplastic porous absorbing layer) for example a thermoplastic organic polymer so as to form rapidly a single-phase solution with the polymeric material by injecting said pore-forming agent as a supercritical fluid.

Usually, the supercritical pore-forming agent is introduced into said polymeric material, which is designated to form the at least one porous absorbing layer, via a port of an extruder. As outlined above, the supercritical pore-forming agent to be used according to the present invention preferably is selected from the group consisting of supercritical nitrogen and supercritical carbon dioxide. In principle, other supercritical fluids such as supercritical helium or supercritical oxygen can be used as well. However, even if the supercritical point of such agents allows their usage, flammability, costs and/or health and environmental concerns may create disadvantages compared to supercritical nitrogen or carbon dioxide. The supercritical point of nitrogen is at 34 bar and −147° C., while the supercritical point of carbon dioxide is at 72 bar and 31° C. The concentration of the supercritical pore-forming agent in the polymer mixture forming the at least one thermoplastic porous absorbing layer is usually in a range of from 0.001 to 10 weight-%, preferably in the range from 0.005 to 1 weight-%, most preferably in the range from 0.01 to 0.5 weight-% based on the weight of the polymer mixture forming said at least one thermoplastic porous absorbing layer.

In addition, optionally the at least one porous absorbing layer may comprise a filler. Preferably, said filler is an inorganic filler. In a preferred embodiment said filler—if used—is selected from silica(s) such as quartz, fused quartz, cristobalite, diatomaceous earth, silica sol, silica gel, precipitated or pyrogenic silica or any combination of these silica types, talc, calcium carbonate(s), barium sulfate, alumina(s), aluminum hydroxide(s), magnesium hydroxide, titania, zirconia, silicate(s) preferably precipitated Ca-, Al-, CaAl-, NaAl-silicates, as mica(s), kaolin, wollastonite or any combination of these silicates, NaCl or any combination between substances of these different substance groups. Such fillers are preferably added in a fine particulate form, although other forms like gel etc. can be used if desired.

In a more preferred embodiment the filler is selected from silicates, carbonates, or hydroxides known to a person skilled in the art. Most widely used is talc or calcium carbonate. Preferably, the filler(s) used has/have an average grain size in the range from 0.02 to 12 µm, more preferred in the range from 0.05 to 8 µm, often in the range from 0.2 to 5 µm. Such filler(s) may also improve retaining of the at least one transferable functional additive in/into/onto the at least one porous inner layer. Preferably, the at least one porous absorbing layer is able to carry the at least one transferable functional additive. Typically the filler is added in an amount of from 0.1 to 19 weight-%, preferably from 0.1 to 15 weight-%, most preferably from 0.2 to 12 weight-%, based on the weight of the polymeric material used to form the at least one thermoplastic porous absorbing layer comprising pores which can absorb and retain at least one transferable functional additive.

Furthermore, optionally the at least one thermoplastic porous absorbing layer may comprise a nucleating agent. According to the present invention the nucleating agent may be selected from the group consisting of carbonates (e.g. sodium bicarbonate), hydrazine derivatives (e.g. 4,4'-oxibis (benzenesulfonylhydrazide)), azo compounds (e.g. azodicarbonamide), semicarbazides, tetrazoles, nitroso compounds and/or citric acid and derivatives thereof. If at least one of the at least one porous absorbing layers contains polypropylene, the nucleating agent can be a β-nucleating agent.

In a preferred embodiment of the present invention in the multi-layered (co)extruded thermoplastic food casing according to the present invention (i.e., after its production) the at least one thermoplastic porous absorbing layer consists of polymer and optionally a filler and/or optionally a nucleating agent (in other words in such a case the at least one thermoplastic porous absorbing layer does not comprise any one of the below mentioned "conventional" pore-forming agents).

Alternatively and/or in addition, in the multi-layered (co)extruded thermoplastic food casing according to the present invention (i.e., after its production) the at least one thermoplastic porous absorbing layer of the food casing according to the present invention may comprise liquid pore-forming agents selected from the group consisting of the following pore-forming agents:

1. mineral oils
2. vegetable oils such as peanut oil, soybean oil, sunflower oil, rape-oil, olive-oil or any combination thereof,
3. esters of natural fatty acids,
4. synthetic fatty acid esters of glycerin, such as glycerin monolaurate, glycerin monooleate, glycerin dioleate, glycerin trioleate or any combination thereof,
5. mono- or diglycerides of fatty acids, which optionally have been reacted to esters with any organic acid e.g. like acetic acid, lactic acid, citric acid or biacetyl tartaric acid or any combination thereof or any combination of substances within the different chemical groups,
6. polyglycerol esters of fatty acids,
7. alkyl polyglucosides,
8. esters of saccharose,
9. sugar glycerides,
10. sorbitan fatty acid esters such as sorbitan monostearate, sorbitan tristearate, sorbitan monolaurate, sorbitan monooleate, sorbitan monopalmitate or any combination thereof,
11. polyoxyethylene-sorbitan fatty acid esters such as Polysorbat® 20 (polyoxyethylene-(20)-sorbitan monolaurate), such as Polysorbat® 40 (polyoxyethylene-(20)-sorbitan monopalmitate), such as Polysorbat® 60 (polyoxyethylene-(20)-sorbitan monostearate), such as Polysorbat® 65 (polyoxyethylene-(20)-sorbitan tristearate) or like Polysorbat® 80 (polyoxyethylene-(20)-sorbitan monooleate),
12. C12- to C18-fatty alcohol ethoxylates,
13. Pore-forming liquids based on glycerin or lecithin such as viscous oil-like, but more polar liquids for example compounds on the basis of glycerin, lecithin or any combination thereof, and
14. glycolic compounds such as polyethylene glycol, propylene glycol ester especially of natural fatty acids like oleic acid, lauric acid, stearic acid, palmitic acid or any combination thereof.

Usually, the at least one thermoplastic porous absorbing layer contains a locally varying porosity in the range of from 0 to 90% by volume, depending on the desired pattern on the surface of the sausage.

If more than one thermoplastic porous absorbing layer is included in the casing, the porosity may preferably be varied from layer to layer, especially in such way that the innermost or the second innermost porous layer of all said inner porous layers has the highest porosity.

Nevertheless, the group of all porous absorbing layers of a casing usually shows a locally varying porosity in the range of from 0 to 90% by volume, depending on the desired pattern on the surface of the sausage.

The pore diameters of the pores and porosity channels in the at least one thermoplastic porous absorbing layer may preferably be in the range from 0.01 to 2000 µm, often in the range from 0.05 to 1200 µm. Preferably, the at least one thermoplastic porous absorbing layer of the food casing has pore channels predominantly having diameters in the range from 0.02 to 1000 µm, more preferred in the range from 0.1 to 800 µm, as calculated via the numbers of well visible pores and their smallest diameter in the plane of the surface under a scanning electron microscope (SEM) or on SEM photographs. Often, the pore size distribution of the pores of the at least one thermoplastic porous absorbing layer shows a pore size distribution that has two, three or four peaks. The average diameter d50 of the pore diameter distribution in the at least one thermoplastic porous absorbing layer may preferably be in the range from 0.1 to 500 µm, more preferred in the range from 0.5 to 400 µm or from 1 to 300 µm, most preferred in the range from 1.5 to 200 µm or from 2 to 150 µm. In many embodiments, the d95 data of the pore diameter distribution in the at least one thermoplastic porous absorbing layer may preferably be in the range from 10 to 3500 µm, more preferred in the range from 20 to 3000 µm or from 30 to 2400 µm, most preferred in the range from 40 to 1800 µm or from 50 to 1400 µm or from 60 to 1000 µm.

The porosity of the different layers of the food casing according to the present invention may be measured on cross-sections of casings or films prepared with a cryomicrotome. The measurements of the (total) porosity may be performed under a scanning electron microscope (SEM) or on SEM photographs, e.g. with the aid of measurement lines counting the number of points or measurement lengths for the porosity in relation to the total number of points respectively length of the total measurement length. According to the present invention the porosity is the sum of the interconnected porosity (pore channels etc.) and of the closed porosity (closed pores). The ratio of the interconnected porosity to the closed porosity may vary in broad ranges. Depending on the pore size the interconnected porosity may be measured according to the mercury pressure penetration method with the aid of adequate high pressure equipment. However, in cases, which involve larger pore sizes, the absorption/adsorption capacity of the porosity formed cannot be adequately determined by the evaluation of cross-sections or the mercury pressure penetration method. In these cases the porosity can be easier determined by measuring the total wall thickness of the at least one inner or outer porous layer using a thickness gauge and determining the free volume via subtraction of the non-porous volume of said at least one layer which was extruded. For the non-porous volume the layer thicknesses of barrier layers in the final casings are evaluated by light microscopy. Knowing the extruded volume for every individual layer via the rotations per minute of its melt pump, the layer thickness of the outer non-porous layer(s) is calculated by dividing the thickness of all barrier layers by their extruded volume per minute and multiplying by the extruded volume of the outer layer. The porosity is calculated using the ratio of the thickness of the at least one porous absorbing layer when non-porous to the layer thickness of the porous layer(s), resulting from the difference between average layer thickness and the sum of all thicknesses of the barrier layers.

The at least one thermoplastic porous absorbing layer is preferably able to absorb/adsorb the at least one transferable functional additive such as liquid smoke at least within the areas of high retaining capacity within a contact time e.g. of up to 15 to 25 s at 20° C. and at atmospheric pressure when assuming a layer thickness of the at least one thermoplastic porous absorbing layer as being in the range from 10 to 200 µm, in an amount of preferably in the range from 1 to 100 g/m$^2$, more preferably in the range from 5 to 90 g/m$^2$ or from 10 to 80 g/m$^2$, most preferred in the range from 15 to 70 g/m$^2$ especially of liquid smoke of the product "Hickory Teepak Alkalized Smoke" by Kerry Ingredients & Flavours or of the product "SmokEz Cherrywood Poly2515" by Red Arrow. With these liquid smokes, coating weights of functional additive of more than 0.3 g/m$^2$ per µm porous absorbing layer thickness, more preferably more than 0.4 g/m$^2$ per µm porous absorbing layer thickness, most preferably more than 0.5 g/m$^2$ per µm porous absorbing layer thickness can be obtained. Depending on the composition of the at least one thermoplastic porous absorbing layer and of the functional additive, the absorption of a functional additive into the at least one thermoplastic porous absorbing layer may take longer than 15 to 25 s, e.g. several minutes, hours or even days.

The compositions and other properties of more than one layer of the at least one thermoplastic porous absorbing layers within one casing may differ between an innermost absorbing layer and one or more other absorbing layer(s), although they may be partially or totally identical if desired.

If there is present at least one additional porous absorbing layer adjacent to the innermost porous absorbing layer contacting the foodstuff, the at least one additional porous absorbing layer can increase the amount of functional food additive, which can be absorbed/adsorbed by the casing, and/or it can improve the adhesion of the adjacent layers, which may show less adhesion if the additional porous absorbing layer were not present. A typical example is a porous absorbing layer based on modified polyolefin as an adhesive layer between a non-porous layer based on polyamide and an innermost porous absorbing layer based on polyolefin.

In a preferred embodiment as the thermoplastic organic polymers of an absorbing layer comprising polyamide and polyolefinic components or of an additional absorbing layer between the innermost absorbing layer and an adjacent barrier layer there may be used copolymers of ethylene or propylene, more preferably linear alpha-olefins with 3 to 8 C-atoms with alpha-beta-unsaturated carboxylic acids, more preferably acrylic acid, methacrylic acid and/or their metal salts and/or their alkylester or corresponding graft-copolymers of the above-mentioned monomers onto polyolefins or partially saponified ethylene/vinylacetate-copolymers, which are optionally graft-polymerized with an alpha-beta-unsaturated carboxylic acid and have a low degree of saponification, or their blends. Furthermore, modified polyolefins such as modified homo- or copolymers of ethylene and/or propylene and optionally further alpha-olefins with 3 to 8 C-atoms, which contain grafted monomers such as alpha-beta-unsaturated dicarboxylic acids, preferably maleic acid, fumaric acid, itaconic acid or their acidic anhydrides, acid esters, acid amides or acid imides can be used according to the present invention. Most preferred are polyolefins which contain grafted maleic anhydride, because grafted maleic anhydride groups provide an adhesive function so that blends of polyamide and polyolefin components are compatibilized or delamination of e.g. polyamide-based and polyolefin-based layers can be avoided.

The Layer Having a Barrier Effect for Water Vapor

Usually the at least one layer having a barrier effect for water vapor is predominantly made of a thermoplastic polymer. A layer having a good barrier effect for water vapor renders the casing to have a water vapor transmission rate of 0.01 to 500 g/m$^2$d, preferably 0.1 to 100 g/m$^2$d, more preferably 1 to 20 g/m$^2$d, even more preferably 1 to 10 g/m$^2$d at 23° C. and 85% relative humidity according to ASTM E398-03. If the food casing according to the invention shows a water vapor transmission rate of 20 g/m$^2$d or less, then the encased foodstuff does not easily lose its moisture and the encased meat products stay fresh for extended time periods. When at least one layer showing a barrier effect for water vapor is present within the multilayered coextruded food casing, especially for sausages, the exudation of meat juice originating from the food through the casing wall is efficiently prevented.

Said thermoplastic polymers to be used for the at least one layer having a barrier effect for water vapor are typically the same thermoplastic polymers as those mentioned above. In a preferred embodiment said thermoplastic polymers to be used are selected from the group consisting of polyolefins, copolymers comprising ethylene and/or propylene and/or linear alpha-olefins with 3 to 8 C-atoms, copolymers to be used for an optional adhesive layer as described below, polyamides (homo-, co- or ter-polyamides), thermoplastics having an oxygen barrier effect and (co)polyesters. Mixtures of these thermoplastic polymers can be used as well. Where necessary, compatibilizers known to a person skilled in the art can be added to the thermoplastic polymer. Compatibilizers can for example be selected from the group consisting of copolymers of ethylene and vinyl acetate (EVA), ethylene and acrylic acid (EAA), ethylene and methacrylic acid (EMAA), ethylene and methyl acrylate (EMA), ionomers and/or anhydride modified polyolefins.

The water vapor barrier properties may be provided by using at least one polyolefin layer. These layers typically predominantly comprise organic polymers based on polyethylene, polypropylene, polybutylene, copolymers containing units of ethylene, of propylene, of α-olefin preferably with 4 to 8 carbon atoms, of dienes and/or any combination of these units or any combination of such organic polymers. Even functionalized vinyl monomers like vinyl acetate, (meth)acrylic acid and (meth)acrylic acid ester may be possible co-units for the copolymers. The more preferred copolymers are those comprising C2/C3 or C2/C8 polyolefin copolymers or a combination of these.

Furthermore, the at least one layer having a barrier effect for water vapor may additionally contain a dye, a fine-grained pigment or both which may be used for the coloring and/or for the UV protection of such casings. The at least one layer having a barrier effect for water vapor, therefore, may optionally be colored. Also slip and/or anti-blocking additives may be added, if the layer is a surface layer.

The compositions and other properties of more than the at least one layer having a barrier effect for water vapor within one casing are independent one from the other, although they may be partially or totally identical.

Often, the at least one layer having a barrier effect for water vapor has a good adhesion to an adjacent porous absorbing layer so that there is no necessity to add an adhesion promoter to the material of the at least one layer having a barrier effect for water vapor or to include an adhesion layer between those layers. But, it may be preferred in some embodiments that the at least one layer having a barrier effect for water vapor includes at least one adhesion promoter, especially, if there is a layer having an oxygen barrier effect or another functional layer adjacent which does not comprise (an) adhesion promoter(s).

Additionally, the layer having a barrier effect for water vapor can provide strength, printability and/or protection against external damage. The barrier properties furthermore prevent the absorbed/adsorbed substance from migrating to the outside of the casing during cooking and storage.

The layer thickness of the at least one layer having a barrier effect for water vapor which may comprise (an) adhesion promoter(s) can have a thickness of 1 to 15 µm, preferably 2 to 10 µm, more preferably 3 to 5 µm. If the casing according to the present invention is subjected to a thermoforming-treatment, the above-mentioned thickness is the minimum thickness in the thermoformed areas after the treatment. The starting casing needs to be thicker to compensate the thinning during thermoforming.

The layer thickness of layers having a barrier effect for water vapor can be in a range of from 5 to 60 µm, depending on the required strength, barrier and/or puncture/tear resistance to be achieved. If the casing according to the present invention is subjected to a thermoforming-treatment, the above-mentioned thickness is the minimum thickness in the thermoformed areas after the treatment. The starting casing needs to be thicker to compensate the thinning during thermoforming.

The Layer Having an Oxygen Barrier Effect

According to the present invention a layer having an oxygen barrier effect can be present. Such a layer having an oxygen barrier effect means a layer which is a good barrier for oxygen or other gases or both and shows preferably an oxygen gas transmission rate (OTR) through the food casing of the present invention of 30 $cm^3/(m^2 \cdot d \cdot bar)$ or less, preferably of less than 20 $cm^3/(m^2 \cdot d \cdot bar)$, often in the range of 6 to 12 $cm^3/(m^2 \cdot d \cdot bar)$, sometimes of about 0.1 or about 1 to less than 6 $cm^3/(m^2 \cdot d \cdot bar)$ when tested according to DIN 53380-3 at 23° C. and 50% relative humidity.

Suitable plastic materials for forming such layers include ethylene vinyl alcohol copolymers (EVOH), which may optionally be partially or totally saponified, or vinylidene chloride copolymers (PVDC), for example with vinyl chloride or (meth)acrylate as comonomers or a mixture of these. These polymers may be admixed with additives, such as softeners or other organic polymers, e.g. copolyamides and/or ionomers. Therefore, the compositions for the manufacture of a layer having an oxygen barrier effect as well as the composition of the formed layer having an oxygen barrier effect may consist essentially of the above mentioned components, if desired. The compositions and other properties of more than one layer having an oxygen barrier effect within one casing are independent from one another, although they may be partially or totally identical.

Optionally, the food casing according to the present invention further comprises at least one adhesive layer which will be described in more detail below. Said optional at least one adhesive layer can be in direct contact with a layer having an oxygen barrier effect on at least one side of the layer having an oxygen barrier effect, especially if the adjacent layer is not a layer comprising an adhesion promoter.

The layer thickness of a barrier layer having oxygen barrier effect can be in a range of from 1 to 20 µm, preferably 2 to 15 µm, more preferably 2 to 10 µm. If the casing according to the present invention is subjected to a thermoforming-treatment, the above-mentioned thickness is the minimum thickness in the thermoformed areas after the treatment. The starting casing needs to be thicker to compensate the thinning during thermoforming.

If the multi-layered coextruded thermoplastic food casing according to the present invention is to be used for fermenting products and/or cheese, the permeability for gases such as oxygen may be desired and, thus, a layer having an oxygen barrier effect may have a larger OTR than mentioned above or may not be present at all.

Optional Adhesive Layer

In some cases the layers having a barrier effect for water vapor and/or the layers having an oxygen barrier effect of the casing according to the invention do not adhere sufficiently to each other and/or to other layer(s) when they are coextruded without any adhesive layer in between or without any layer having a high enough content of at least one adhesion promoter or without both. Good adhesion may be achieved, for example, if at least one intermediate adhesive layer is generated between neighbouring layers of at least one other type. Such an adhesive layer providing suitable adhesion properties may predominantly contain grafted copolymers, linear copolymers or both types of copolymers. These copolymers may comprise more than one or even more than two different monomer types, for example ethylene units, propylene units, (meth)acrylic acid units, (meth)acrylic acid ester units, vinyl acetate units, maleic anhydride units or any combination of these. More preferred are maleic anhydride grafted polyethylenes (LDPE-g-MAAA, HDPE-g-MAA, LLDPE-g-MAA and the like), ethylene-acrylic acid ester copolymers, ethylene-vinyl acetate copolymers (EVA) or any combination of these. All these polymeric substances may be present alone or in combination in anyone of the adhesive layers. Furthermore, the adhesive layer may additionally contain any further organic polymers like polyethylene, any pigments, any other additives or any combination of these. Therefore, the compositions for the manufacture of an adhesive layer as well as the composition of the formed adhesive layer may consist essentially of the above mentioned substances if desired. The compositions and other properties of more than one adhesive layer when more than one adhesive layer is present in one casing according to the invention are independent one from the other, although they may be partially or totally identical. The intermediate adhesive layer(s) may be omitted if there is a high enough adhesion between neighbouring layers as it often occurs for example between polyamide layers and some types of ethylene vinyl alcohol copolymers (EVOH) layers or if any adhesive promoter is admixed into the composition of the adjacent layers e.g. a layer having a barrier effect for water vapor and/or an oxygen barrier effect.

Typically, the adhesive layer contains at least 50% by weight of at least one substance that has adhesive properties. Often, its content is at least 60% by weight, more preferred at least 70% or 80% by weight, sometimes at least 90% by weight, in most cases even up to 100% by weight. By the adequate selection and use of at least one adhesion promoter for the adhesive layer, an excellent adhesion between the adjacent layers is generated. Thereby, adhesion of parts of the casing or parts at least of the inner layer to the food can be minimized or prevented.

Often, at least one adhesive layer is a good barrier for water vapor, but in many embodiments an adhesive layer can be the only barrier for water vapor in the food casing. If there is another layer in the casing that is a barrier for water vapor as defined above, there may perhaps not be any adhesive layer.

Optional Additional Functional Layer

According to the present invention the food casing of the invention may optionally further comprise one or more additional functional layer(s). The optional additional functional layer(s) preferably contain(s) at least 50% by weight of (co-)polyamide(s), often at least 60% by weight, more preferred at least 70% or at least 80% by weight, sometimes even at least 90% by weight, sometimes even at least 95% or even up to 100% by weight.

Such an additional functional layer may contain one, two or even several different aliphatic polyamides, aliphatic co-polyamides or both as well as optionally a content of partially aromatic polyamides, partially aromatic co-polyamides or both.

Examples of the (co-)polyamides to be used for the optional additional functional layer are:
- aliphatic Polyamides: PA6, PA66, PA11, PA12;
- aliphatic co-polyamides: PA4/6, PA6/66, PA6/69, PA6/9, PA6/10, PA6/12, polyether amides, polyester amides, polyether ester amides, polyamide urethanes, poly(ether-block-amides);
- partially aromatic polyamides: PA6-I (I=isophthalic acid), Nylon-MXD-6 (polycondensate of m-xylylenediamine and adipic acid);
- partially aromatic co-polyamides: PA6-I/6-T, PA6/6-I (I=isophthalic acid, T=terephthalic acid).

Especially preferred components are PA6, PA66, PA 12, PA6/66, Nylon-MXD-6 or PA6-I/6-T or any combination thereof. Especially preferred mixtures contain at least two different substances of these components. The amount of partially aromatic (co-)polyamides may preferably be not more than 40% by weight in relation to a single additional functional layer, more preferred not more than 25% by weight.

Additionally, the at least one additional functional layer may contain any other organic polymeric material such as olefinic copolymers such as ethylene-(meth)acrylic acid copolymers (EMAA), ionomeric materials derived from or related to EMAA, ethylene vinyl alcohol copolymers (EVOH), even water-soluble or hot water-soluble synthetic organic polymeric materials like polyvinyl alcohols (PVA) which all may optionally be partially or totally saponified, polyvinyl pyrrolidone (PVP), polyvinylpolypyrrolidone (PVPP), copolymers of vinylalcohols with propene-1-ol, polyalkylene glycols, copolymers of vinyl pyrrolidone with at least one-olefinic unsaturated monomer unit, polymeric materials of N-vinylalkylamides or (co-)polymers of acrylic acid, of acrylamide or of acrylic acid and acrylamide or any combination of all of these substances.

The amount of the at least one other organic polymeric material of the at least one additional functional layer that is not a (co-)polyamide, is preferably less than 50% by weight in relation to the content of solids and effective compounds of the composition to be used for a single additional functional layer as well as in relation to the material of a single additional functional layer, more preferred not more than 40% by weight, but often at least 0.1% by weight.

Furthermore, the optional additional functional layer(s) may optionally contain at least one fine-grained pigment, at least one additive like a lubricant, an anti-blocking agent, a light stabilizer or any combination of these. Therefore, the compositions for the manufacture of an optional additional functional layer as well as the composition of the generated additional functional layer can consist essentially of the above mentioned substances if desired.

The compositions and other properties of more than one additional functional layer within one casing are independent from each other, although they may be partially or totally identical.

The optional additional functional layer(s) may have a layer thickness of 2 to 40 μm, preferably 3 to 30 μm, more preferably 4 to 20 μm. The thickness depends on the effect the layer shall provide, for example it may contribute to the strength and barrier effect of the final casing structure. If the casing according to the present invention is subjected to a thermoforming-treatment, the above-mentioned thickness is the minimum thickness in the thermoformed areas after the treatment. The starting casing needs to be thicker to compensate the thinning during thermoforming.

Optionally at least one additional functional layer can be positioned as an outermost layer without direct contact to the at least one thermoplastic porous absorbing layer. In this case for example the additional functional layer may provide a good printability.

In order to obtain casings with good printability, polyamides or polyester such as polyethylene terephthalate (PET) can be used as materials for the functional additional layer. Especially the use of polyethylene terephthalate results in high gloss. In addition, the high melt temperature of PET may broaden the range of applicable embossing temperatures, which is limited by the difference between the melting temperature of the polymer of the at least one thermoplastic porous absorbing layer and the melting temperature of the at least one layer having a barrier effect for water vapor and/or oxygen.

The layer thickness of a functional additional layer showing good printability can be in a range of from 3 to 40 μm. If the casing according to the present invention is subjected to a thermoforming-treatment, the above-mentioned thickness is the minimum thickness in the thermoformed areas after the treatment. The starting casing needs to be thicker to compensate the thinning during thermoforming.

Optional layer additives and the order in which layers are arranged if desired.

If any layer except for an optional adhesive layer should contain at least one adhesion promoter (i.e. a substance having adhesive properties), the content of the at least one adhesion promoter in this layer is preferably up to 50% by weight, more preferred up to 40% by weight, often up to 30 or 20% by weight, sometimes up to 10% by weight. Suitable adhesion promoters include preferably organic polymeric materials of adhesive behavior.

In some embodiments, the at least one layer having a barrier effect for water vapor and/or oxygen contains at least one adhesion promoter which may be present in an amount as mentioned above. In some embodiments, it is preferred that the at least one layer having a barrier effect for water vapor and/or oxygen which layer comprises a content of at least one adhesion promoter is in direct contact to the at least one porous absorbing layer, which means that there is no adhesive layer between the at least one layer having a barrier effect for water vapor and/or oxygen and the at least one porous absorbing layer.

In one preferred embodiment the at least one layer having a barrier effect for oxygen is present in the food casing of the present invention. If the food casing of the invention has a barrier effect for oxygen and perhaps even additionally for some other gases, the enclosed food may be preserved for a longer time.

In one further preferred embodiment the food casing according to the invention comprises at least one layer with a barrier effect for oxygen and at least one layer with a barrier effect for water vapor, wherein in some embodiments both of these effects may be present in the same layer(s). In some embodiments, especially the at least one layer having a barrier effect for water vapor or the optional adhesive layer (HV) or any combination thereof may show a barrier effect for oxygen, which is sufficient for the application. However, often polyolefins will not offer a high enough barrier effect for oxygen in non-fermenting sausage applications.

The casings according to the invention can further contain additional processing aids like anti-blocking agents, slip agents, stabilizers and/or anti-statics. Their content in the composition is usually in a range of 0.01 to 5 weight-%, based on the total weight of the casing.

The coextruded thermoplastic food casing according to this invention can be a flat film, which is sealed to a tube latest at the point of stuffing, a sealed flat film or a seamless tubular casing. In addition, the coextruded thermoplastic food casing can be a laminate comprising mono- and/or multi-layer films which are laminated before a thermoforming step.

The multi-layered coextruded thermoplastic food casing according to the invention may be a plastic film which comprises 2, 3, 4, 5, 6, 7, 8, 9, 10, 11, 12 or more than 12 layers. Said at least one porous absorbing inner layer is able to transfer the at least one transferable functional additive from at least one absorbing inner layer to the food. Preferably, the food casing has at least one layer which has a barrier effect for water vapor and/or oxygen. There may be even 2, 3, 4 or even more than 4 layers having a barrier effect for water vapor and/or oxygen.

In case that the areas having a reduced average layer thickness and the areas having a non-reduced average layer thickness of the at least one porous absorbing layer are generated by an embossing treatment, it is essential that at least one layer having a barrier effect for water vapor and/or oxygen has a higher melting temperature than the thermoplastic material of the at least one porous absorbing layer so that the porosity of the at least one porous absorbing layer can be modified without damaging the at least one layer having a barrier effect for water vapor and/or oxygen, for example by using an embossing tool, which is heated to a temperature high enough to melt the at least one porous absorbing layer but not to melt the at least one layer having a barrier effect for water vapor and/or oxygen. The difference between the melting temperature of the material of the at least one porous absorbing inner layer and the melting temperature of the material of the at least one layer having a barrier effect for water vapor and/or oxygen, with the melt temperatures being measured according to DIN EN ISO 11357-3, should be larger than 30° C., preferably larger than 40° C., more preferably larger than 50° C., most preferably more than 60° C.

In case that the areas having a reduced average layer thickness and the areas having a non-reduced average layer thickness of the at least one porous absorbing layer are generated in a thermoforming process, the materials of the different layers need to be selected so as to avoid that the necessary thermoforming-temperature results in a closing and/or fusing of the pores of the at least one porous absorbing inner layer or in a melting of an outer layer, so that the integrity of the coextruded casing is maintained throughout the thermoforming process.

According to the present invention the food casing of the present invention may consist of at least 2 layers (one porous absorbing inner layer and one barrier layer), but can comprise 10 or more layers. Many different multilayer structures are possible. More preferred, a casing according to the invention comprises two, three, four, five or seven layers, even more preferred five or seven layers as shown below. The following abbreviations in the denomination of the layer-types are used:

paL: porous absorbing Layer
BL: Bulk Layer with barrier effect, adhesive effect and/or additional function Where necessary, the following abbreviations are used to describe material-subtypes:

A: optional adhesive material
B: material having a water vapor barrier effect, for example a material formed of polyolefin
C: material having a water vapor barrier effect, for example a material formed of polyamide
D: optional material having an oxygen barrier effect
E: optional polyethylene terephthalate material The letters can be followed by numbers defining layers of the same material-(sub)type, whose composition may be different, but it can also be the same composition for two or more layers of the same material-(sub)type.

The general structure of the casing according to the invention is from food contact side to outside:

paL/ . . . /BL/ . . .

The structure can be extruded as a tubular casing with the at least one porous absorbing layer on the inside or on the outside. If the porous absorbing structure is on the outside, the casing has to be inverted at some point in the process before or latest while being stuffed with the foodstuff.

The bulk layer BL can have adhesive properties (subtype A), water vapor barrier properties (subtypes A, B and C), oxygen barrier properties (C- and D-layers) and/or optimized printing properties (C- and E-layers) as needed in the application of the casing.

Consequently preferred structures are as follows, but they are not limited to those listed:

| | |
|---|---|
| 2 layers: | paL-B1/BL-B2 |
| | paL-A/BL-C |
| | paL-C1/BL-C2 |
| 3 layers: | paL-B1/BL-A/BL-B2 |
| | paL-B/BL-A/BL-C |
| | paL-A/BL-C1/BL-C2 |
| | paL-C1/BL-A/BL-C2 |
| 4 layers: | paL-B1/BL-B2/BL-A/BL-C |
| | paL-B1/paL-B2/BL-A/BL-C |
| | paL-C1/BL-C2/BL-D/BL-C3 |
| 5 layers: | paL-B1/BL-B2/BL-A1/BL-C/BL-A2 |
| | paL-B1/paL-B2/BL-B3/BL-A/BL-C |
| | paL-B1/BL-A1/BL-B2/BL-A2/BL-C |
| | paL-B/BL-A/BL-C1/BL-D/BL-C2 |
| | paL-C1/BL-C2/BL-A1/BL-C3/BL-C4 |
| | paL-C1/paL-A/BL-B/BL-A/BL-C2 |
| | paL-C1/paL-C2/BL-C3/BL-A/BL-C4 |
| 6 layers: | paL-B1/BL-B2/BL-A/BL-C1/BL-D/BL-C2 |
| | paL-B1/paL-B2/BL-A/BL-C1/BL-D/BL-C2 |
| | paL-B1/BL-B2/BL-A1/BL-C/BL-A2/BL-E |
| 7 layers: | paL-B1/paL-B2/BL-B3/BL-A/BL-C1/BL-D/BL-C2 |
| | paL-C1/BL-A1/BL-C2/BL-D/BL-C3/BL-A2/BL-E |
| 8 layers: | paL-B1/BL-B2/BL-A1/BL-C1/BL-D/BL-C2/BL-A2/BL-E |
| | paL-C1/BL-C2/BL-A1/BL-C3/BL-D/BL-C4/BL-A2/BL-E |
| 9 layers: | paL-C/BL-A1/BL-B/BL-A2/BL-C1/BL-D/BL-C2/BL-A3/BL-E |
| | paL-C/paL-A/BL-B/BL-A1/BL-C1/BL-D/BL-C2/BL-A2/BL-E |

Especially if the at least one bulk layer BL comprises only compositions based on polyamides (BL-C) and other hydrophilic thermoplastic polymers, the casing can be permeable to water vapor without allowing the substances absorbed into the at least one porous absorbing layer(s) paL to migrate to the outside of the casing, contaminating people or machinery during handling and processing. Obviously, with the number of layers, the possible combinations increase, and thus the listed structures can only give a small selection of possible structures.

In a more preferred embodiment the following structures are preferred:
5 layers: Porous absorbing inner layer/bulk layer having barrier effect/adhesive layer/bulk layer having barrier effect/bulk layer having barrier effect,
Porous absorbing inner layer/adhesive layer/bulk layer having barrier effect/adhesive layer or bulk layer having barrier effect/bulk layer having barrier effect,
Porous absorbing inner layer/absorbing layer optionally having adhesive effect/bulk layer having barrier effect/adhesive layer/bulk layer having barrier effect, such as paL-B1/BL-A1/BL-B2/BL-A2/BL-C
    paL-B/BL-A/BL-C1/BL-D/BL-C2
    paL-B1/paL-B2/BL-B3/BL-A/BL-C
    paL-C1/BL-C2/BL-A1/BL-C3/BL-C4
    paL-C1/paL-A1/BL-B/BL-A2/BL-C2
    paL-C1/paL-C2/BL-C3/BL-A/BL-C4 and
7 layers: Absorbing inner layer/absorbing layer optionally having adhesive effect/bulk layer having barrier effect/bulk layer having adhesive effect/bulk layer having barrier effect/bulk layer having barrier effect/bulk layer having barrier effect,
Absorbing inner layer/adhesive layer/bulk layer having barrier effect/bulk layer having barrier effect/bulk layer having barrier effect/bulk layer having adhesive effect/bulk layer having functional effect, such as
    paL-B1/paL-B2/BL-B3/BL-A1/BL-C1/BL-D/BL-C2
    paL-C1/BL-A1/BL-C2/BL-D/BL-C3/BL-A2/BL-E.

The smaller the number of layers in the casing according to the invention, the more care has to be taken that there is at least one layer generating sufficient strength and flexibility. This may require that the at least one layer having a barrier effect for water vapor and/or oxygen has no or nearly no pores and may perhaps be thicker. As the at least one porous inner layer is weakened because of its pores and as its strength is strongly reduced if there are larger pores or well-connected interstices or both, a good adhesion of the at least one porous inner layer to the adjacent outer layer(s) and a sufficient strength of at least one of the non-porous layers is of importance.

Formation of a Patterned Retaining Capacity on at Least One Thermoplastic Porous Absorbing Layer In order to generate at least one porous absorbing inner layer (or outer layer, if the food casing is reversed after the treatment) comprising areas having a reduced average layer thickness and areas having a non-reduced average layer thickness, said at least one porous absorbing layer of the food casing may be subjected to a mechanical and/or thermal treatment such as an embossing and/or thermoforming step.

In order to form for example a net-like design of a functional additive transferred onto a foodstuff enclosed in the food casing according to the present invention, the layer thickness of said at least one porous absorbing layer is reduced in areas which should have a reduced average layer thickness by a range of from 7 to 140 μm and a range of 30 to 85% compared to said areas having a non-reduced average layer thickness. More preferable the layer thickness of said at least one porous absorbing layer is reduced in areas which should have a reduced average layer thickness by 7 to 120 μm, even more preferably by 8 to 90 μm, even more preferably by 8 to 60 μm, even more preferably by 15 to 60 μm, most preferably by 20 to 40 μm, so that areas having a reduced layer thickness are formed wherein the amount of functional additive which can be adsorbed and/or absorbed differs compared to the surrounding areas having a non-reduced layer thickness. When doing so, a pattern of areas is formed which creates a significant difference in the transferred amount of the functional additive onto the foodstuff between areas of high and areas of low retaining capacity.

Furthermore, in order to form for example a net-like design of a functional additive transferred onto a foodstuff enclosed in the food casing according to the present invention the layer thickness of said at least one porous absorbing layer should be reduced in areas having a reduced average layer thickness by a range of from 30 to 85%, preferably by 30 to 80%, more preferably 35 to 75%, even more preferably 55 to 70% compared to said areas having a non-reduced average layer thickness, so that a pattern of areas is formed on said at least one porous thermoplastic layer which is able to transfer functional additive such as liquid smoke onto the enclosed foodstuff in such a way that a visually verifiable contrast in the amount of functional additive being transferred can be determined.

An embossing treatment may include continuous methods using cylinders or nip reels having the desired net-like surface or logo as a male/positive and heated relief on their surface as well as discontinuous methods such as hot-stamping by e.g. hot stamping plates. Usually, the coextruded food casing according to the present invention does not have to be pre-heated. Instead, the casing is passed through a pair of metal shafts having a male/positive and heated image on the surface thereof corresponding for example to a net-like pattern. The embossing tool needs to be heated to the temperature, in which upon contact of the tool with the casing the thermoplastic polymer of the matrix of the at least one to-be-embossed porous absorbing layer is close to its thermo-plastic state or even in the melt state. (Co)Polyamide-containing layers should be dry to avoid formation of humidity gas bubbles. This way of embossing a non-inflated casing can be done especially in case that the at least one porous absorbing layer is an outer layer of the—later reversed—casing at the time of embossing.

In case that the at least one porous absorbing layer is the inner layer of a tubular casing at the time of embossing, it needs to be avoided that the embossing treatment seals the casing together. Surprisingly, it can be sufficient to leave an air cushion between the embossing nip reels, i.e. to not have an anvil to emboss against, and still obtain the desired texture in the at least one porous absorbing layer, especially when the casing is an oriented casing. If the texture design is to cover the entire circumference of the casing, the design can be distributed to the clichés of 2 consecutive pairs of nip reels, the pairs being set up perpendicular to each other, squeezing the inflated casing just enough to have every location of the casing's circumference get into contact with at least one of the reels once, when passing through the set of nip reels.

Another method to emboss a diamond-shaped net onto a tubular casing is to guide the inflated casing through 2 counter-rotating rings of larger diameter than the diameter of the inflated casing. The rotating rings each are equipped with a number of radially positioned heated pins or nozzles releasing a hot air jet, the diameter of pins or nozzles equaling the yarn-width of the desired net-pattern and the distance between the pins or nozzles when affecting the inflated casing equaling the mesh-width of the desired net-pattern.

Alternatively the effect of the embossing treatment, namely the local reducing of the porosity of the at least one porous absorbing layer, can be substituted by other contact or non-contact methods, which create enough heat in the at least one porous absorbing layer to effectively reduce the porosity therein. Such a method can be for example a laser treatment or—depending on the design—one or several jet streams of hot air, drawing the design onto the casing.

Embossing the grid into at least one thermoplastic porous absorbing layer is a preferred surface treatment according to the present invention.

Modifying the retaining capacity of the food casing in a patterned manner can also be achieved by a defined local stretching of the at least one porous absorbing layer in a thermoforming process, thus opening the porosity of said at least one porous absorbing layer and thinning the at least one non-porous layer. For example, carrying out a local stretching during thermoforming the casing by a draw ratio of surface area after thermoforming to surface area prior to thermoforming of e.g. 3, then coating the casing's entire surface with the same amount per surface area of a functional additive and then—in an annealing step—allowing the stretched areas to shrink back by e.g. 30% in both machine direction and transversal direction doubles the available amount of transferable functional additive in the thermoformed and then annealed areas in comparison to the non-thermoformed areas, because after annealing the coated thermoformed area is reduced by 51%. To obtain a surface having a patterned retaining capacity which will give rise to a formation of a net-like pattern on the enclosed food, the retaining capacity difference between the areas having a reduced average layer thickness and the areas having a non-reduced average layer thickness of the food casing should be at least 10%, preferably by at least 40%, most preferably by at least 70%.

Another preferred method for preparing a multi-layered coextruded thermoplastic food casing comprising at least one porous absorbing layer comprises areas having a reduced average layer thickness and areas having a non-reduced average layer thickness, makes use of a thermoforming process. Thermoforming locally stretches the casing and increases the retaining capacity as described above so that at least one porous absorbing layer comprising areas having a reduced average layer thickness and areas having a non-reduced average layer thickness is obtained. The thermoforming of tubular casings can be carried out by using specifically designed molds in corrugator lines. For thermoforming a flat film comprising at least one porous absorbing layer comprising areas having a reduced average layer thickness and areas having a non-reduced average layer thickness, conventional thermoforming lines can be used on the casing according to the present invention.

Prior to thermoforming, the casing is usually pre-heated to a thermoforming temperature of the casing. If the food contact surface is the outside surface at the time of thermoforming, the area of the bulges need to be mechanically stretched, e.g. by so-called plugs, inwards against the air pressure of the inflated casing. If the food contact surface is the inside surface, the area of the bulges will be pneumatically stretched into the thermoforming mold, optionally sucked into the thermoforming mold by vacuum. In both cases, the process of thermoforming a tubular casing requires a control of the air pressure inside the inflated casing. Depending on the position of the thermoforming step in the process, the air pressure control can be achieved through the inflated straight or de-reeling starting casing, through the inflated straight or reeled final casing and/or by maintaining the air pressure between movable nip-reels.

Considering that the cooking process is taking place at temperatures, at which the shrink of stretched areas can be released, for achieving a bulged, e.g. net-like pattern on the foodstuff it is advisable to stretch the casing in thermoforming and/or to anneal the casing in such a way that complete reversing of the deformation during cooking is avoided. This can include the use of moveable heated molds, which allow a relaxation of internal tensions under mold constraint.

The above-mentioned methods of for example embossing and thermoforming can also be combined so as to produce a multi-layered coextruded thermoplastic food casing comprising on the inside surface of the at least one thermoplastic porous absorbing layer comprising areas having a reduced average layer thickness and areas having a non-reduced average layer thickness which layer forms for example a net-like pattern with light-colored grid-lines and bulges on the enclosed foodstuff.

The coextruded thermoplastic food casing according to this invention can be a flat film, which is sealed at the latest at the time of stuffing, a sealed flat film or a tubular casing. For convenience, if the casing is a flat film or a cut-open tubular film, the steps of embossing and/or thermoforming the food contact surface and the coating step with the functional additive can be done before sealing the film to a tube. The sealing can be done e.g. by heated tool welding or preferably by ultra-sonic welding, but depending on the materials used in the structure any other known sealing method can be used, including gluing.

As outlined above, the present invention further provides a method for producing a multi-layered coextruded thermoplastic food casing as defined above, said food casing comprising at least one porous absorbing layer and at least one layer having a barrier effect for water vapor and/or oxygen, wherein said at least one porous absorbing layer comprises areas having a reduced average layer thickness and areas having a non-reduced average layer thickness, wherein the average layer thickness of said at least one porous absorbing layer in areas having a non-reduced average layer thickness is in a range of from 10 to 200 µm and wherein the average layer thickness in areas having a reduced average layer thickness is lower by 7 to 140 µm and reduced by a range of from 30 to 85% compared to said areas having a non-reduced average layer thickness, said method comprising the steps of:

extruding the thermoplastic food casing, optionally subjecting the food casing to an orientation step followed by an annealing step if desired, subjecting the at least one thermoplastic porous absorbing layer of the optionally preheated casing to an embossing and/or thermoforming step followed by an annealing step if desired, coating the at least one porous absorbing layer with a transferable substance followed by a drying step if needed.

If the at least one porous absorbing layer is on the outside, the method includes a step of reversing the casing. If the at least one porous absorbing layer is on the outside, an external coating is advisable, which needs to take place before reversing. Then an optional thermoforming step should take place before the coating in order to achieve the darkening effect described above. In principle the reversing can take place before thermoforming and internal coating. Generally the reversing needs to take place before or during shirring or at the latest before stuffing.

Usually, the method for producing a multi-layered thermoplastic food casing comprises a step of preparing at least two different thermoplastic compositions each comprising at least one organic polymeric material so as to generate at least two different layers by co-extrusion that will be combined at high temperature so as to form a multi-layered thermoplastic food casing.

Before the co-extrusion the thermoplastic compositions usually are softened or softened and thereafter at least partially molten and then passed through an arrangement of extruders connected to heated annular multilayer die having at least as many ring-like channels as needed for the different heated compositions. The melt of the extruders is supplied according to the desired ratio of the layer thicknesses of the different layers. When leaving the die, the extruded food casing solidifies on cooling to a primary multi-layered casing comprising at least two layers well adhering to each other.

In a preferred embodiment the coextruded food casing thereafter may be at least locally mono-axially or bi-axially stretched e.g. with the aid of an air-cushion between two squeezing rollers. During the stretching, the thermoplastic material of the casing is oriented and the casing gains a back-shrinkage (which may be gradually reduced by heat setting) so that the casing is in a tight and well-rounded condition even after use by a "fill-and-cook-in" procedure. During this stretching, the number and/or the volume of the pores may increase.

Thereafter, the stretched multi-layered film may pass through a further heating zone so as to carry out a heat-setting treatment, wherein the casing is usually stabilized by an entrapped air-bubble. Thus, the potential of thermal shrinkage may be reduced to low values as needed for practical application as food casing.

In order to create at least one porous absorbing layer comprising areas having a reduced average layer thickness and areas having a non-reduced average layer thickness, the different techniques described above can be used also in combination. Although in principle a cold mechanical treatment of the surface of the at least one porous absorbing layer of the casing can be carried out, according to the present invention it is advisable to assure that the casing is warmed to a sufficiently high temperature in order to avoid damage of the casing during the process of creating a patterned retaining capacity in the at least one porous absorbing layer.

In the case of thermoforming in order to locally increase the retaining capacity of the surface of said at least one porous absorbing layer, suitable temperatures should be at least above the glass transition temperature of the matrix-forming component. Therefore, pre-heating steps prior to a mechanical treatment step may be preferred. If the at least one porous absorbing layer shall be subjected to heat treatment in order to locally reduce the retaining capacity of the surface of said at least one porous absorbing layer, the temperature of such a local heat treatment is preferably above the melting temperature of the matrix-forming material of the said at least one porous absorbing layer.

One preferred technique to locally reduce the average layer thickness of the surface of said at least one porous absorbing layer is an embossing or hot-stamping treatment, which can take place between plates or cylinders, which have male/positive engravings corresponding to the target design on their surface.

The embossing treatment results in reducing the average layer thickness at the embossed areas of the at least one porous absorbing layer. This can take place as a cold deformation, but is more preferably achieved by using a hot embossing treatment, which partially fuses pores of the at least one porous absorbing layer. In this later case the at least one layer having barrier properties should have a higher melting temperature than the matrix material of the at least one porous absorbing layer to-be-molten. This allows for the at least one transferable functional additive to be only absorbed in areas having an open porosity. The at least one porous absorbing layer treated in this way can be on the outside of the casing, which process thereafter also includes a reversing step to end up with the at least one porous absorbing layer in contact with the enclosed foodstuff, or on the inside of the casing, allowing for external or internal coating, respectively. Again, on the final sausage the grid remains uncoated, giving the appearance as if being formed by a net-cooked smoked product. After the embossing step, optionally a thermoforming step can follow, in which the—optionally additionally pre-heated—casing is formed by a mold or metal-grid.

The local manipulation of the at least one porous absorbing layer can also be carried out by other contact or non-contact techniques of applying an energy to the at least one porous absorbing layer without affecting or destroying the other layer(s). For example a heated, optionally low-tack coated metal grid can be applied to the surface of the at least one porous absorbing layer. Lasers can also be used to manipulate the retaining capacity of the at least one porous absorbing layer. Either the laser beam is directly applied to the surface of the at least one porous absorbing layer, thus melting the porous layer, or the laser light penetrates the laser-transparent non-porous outer layer(s) before converting the energy into heat in the non-laser-transparent absorbing layer. If the at least one porous absorbing layer is the inner layer, the heat treatment needs to take place in an inflated state so that the opposing sides of the inner layer of the tubular casing do not seal together. If the casing is treated in a non-tubular state or with the at least one to-be-fused porous absorbing layer on the outside, additional techniques commonly used for sealing films may be used.

Especially for casings having at least one porous absorbing outer layer (which need to be reversed at a later step before stuffing) a patterned retaining capacity can be formed by embossing. Thereafter, the embossed surface can be printed with the at least one transferable functional additive. The valleys of the embossed grid shall not get into contact with the printing cylinder so that on the final sausage the grid remains uncoated, giving the appearance of a net-cooked smoked product. After embossing grid-like pattern onto the at least one thermoplastic porous absorbing layer, optionally a thermoforming step can be carried out, in which the—if necessary—additionally pre-heated casing is formed by a mold, so that bulges are created.

Also if the at least one porous absorbing layer is at least one absorbing inner layer, a step of embossing a grid may be carried out. The at least one porous absorbing layer is disturbed and therefore during internal coating the embossed areas of the grid do not absorb a functional additive. The effect can be enhanced, if the retaining pattern is additionally formed by a thermoforming process.

In case the embossing is supported by elevated temperatures (e.g. as during hot-stamping), it is essential that the tubular casing internally does not stick together. While this can be avoided by a high enough melting temperature of the inner layer in relation to the embossing temperature if the at least one porous absorbing layer is outside, the sticking of the inner layer to itself may be a limiting factor for the use of heated embossing if the at least one porous absorbing layer is inside. For the latter case, pressing the air-inflated casing against a suitably patterned and heated mold or grid will allow to locally reduce the retaining capacity of the surface of said at least one porous absorbing layer, as the heat will be conducted through the outer layers to the at least one porous absorbing inner layer.

The thermoforming step can be an additional step, taking place together with the embossing of a pattern or can be omitted if embossing is considered to be adequately effective for creating the desired retaining capacity pattern on the at least one porous absorbing layer. If the thermoforming step is a part of texturing the casing, it may take place in vacuum-aided molding devices (such as corrugators) known by the persons skilled in the art or with masks (e.g. metal grids) which allow a deformation through the openings in the mask. Depending on the diameter of the molds of the corrugator, the casing can be oriented in the same step as the thermoforming. Optionally the corrugator can be fed with an already oriented casing, if the casing still is sufficiently thermoformable, because it was not stretched to its maximum area orientation ratio before.

A combination of thermoforming molds with impulse heated wires at the location of the grid can join the 2 steps of fusing the grid pattern and thermoforming the bulges in one mold. After preheating the casing to thermoforming temperature, the casing is inflated against the mold in which first the vacuum-supported thermoforming takes place and then the grid is fused while the casing is in the mold.

The thermoformed bulges offer additional surface to be coated by the at least one functional additive. As the at least one porous absorbing layer is porous, the porosity is further increased by the stretching process while being thermoformed, generating high retaining capacity.

The net-design is characterized by the area ratio of grid-area to non-grid area, by the thickness-ratio of embossed thickness to non-embossed thickness and by the draw ratio of the bulges.

The coating step is typically carried out separately from the extrusion process in order to maintain flexibility in production. However, it is also possible to carry out an outside coating process together with the extrusion, embossing, thermoforming and/or annealing steps in an in-line process if the at least one porous absorbing layer is accessible, i.e. is outside in the case of a tubular casing.

In a preferred embodiment the food casing of the present invention, which shall take up the at least one transferable functional additive, the coating of the outside surface takes place with printing or spraying techniques or by immersing the casing into a bath. Typically, a separate drying step is not necessary if the dosage is adequate. Nevertheless, a drying step, which at the same time may serve as an annealing step if the heat stability of the functional additive is high enough, may be helpful to immobilize the at least one transferable functional additive. Drying can take place by conventional drying technologies like hot air, infrared or other means, including air-blades. While usually air-blades will be set-up in such a way that they are not blowing off the coating, they may be helpful for blowing off surplus coating from low retaining capacity areas or oversaturated locations. If the air-blade is making use of cold air, annealing is not possible, but also shrink will not be released.

If annealing is desired to reduce the shrinkage of the casing and of the thermoformed areas, an annealing step can be introduced assuring that the casing is heated up to the annealing temperature under sufficient tension to not lose the geometrical properties. The thermoformed and coated areas shrink back during drying, so that these areas now have a higher amount of functional additive per area than the non-thermoformed areas, resulting in e.g. different color intensity of the surface of the final food product.

Alternatively, the casing of the present invention, which after embossing and/or thermoforming shall take up the at least one transferable functional additive, may be transferred through two pairs of squeezing rollers arranged one after the other, where there may be located a bubble of liquid containing the composition containing the at least one transferable functional additive which is preferably a solution or a suspension of said at least one transferable functional additive. This impregnation by a moving bubble is possible when the embossed and optionally thermoformed casing with an outside porous absorbing layer has been reversed or the at least one porous absorbing layer is already an inner layer of a tubular casing or an embossed, optionally thermoformed sealed flat film.

When internally coating a casing having a thermoformed pattern of areas having a reduced layer thickness by a moving bubble between pairs of nip reels, the flattened thermoformed areas of reduced layer thickness may trap liquid, which is not being squeezed out of the casing. In this case it is advisable that the at least one porous absorbing layer does not have time to become saturated by the at least one transferable functional additive while being between the pairs of nip reels so that the trapped liquid may be absorbed to some extent by the at least one porous absorbing layer during the following storage of the impregnated casing. This absorption of the liquid functional additive can be increased by using the aforementioned hydrophilic components in the recipe of the layers in contact with the functional additive. In addition, the amount of entrapped liquid is reduced if the bubble is vertically between the 2 nip reels with the casing moving upwards, so that under gravity surplus liquid is flowing out of the thermoformed areas back into the food additive reservoir.

When outside coating via dipping is applied or inside coating via moving bubble is carried out, the coating homogeneously covers the surface of the casing having a pattern of areas having a reduced layer thickness and areas having a non-reduced layer thickness. In contrast, spraying from the outside or spraying from the inside during shirring usually will not supply the functional additive according to the specific locally varying retaining capacity, if the nozzles are not specifically pulsed and positioned for the needs of the desired retaining capacity pattern or if the sprayed amount is less than the amount the total retaining capacity of the casing can retain.

If the impregnation with the at least one transferable functional additive takes place before the thermoforming process but after the embossing/melting step, the thermoformed areas will comprise less additive per surface area of the at least one porous absorbing layer so that on the final food stuff said areas will be less coated by transferable functional additive per area. The color difference between high retaining capacity areas and low retaining capacity areas, which becomes visible on the surface of the sausage, depends on the degree of modifying the porosity of the at least one porous absorbing layer in the embossing/melting step.

The final food casings according to the invention usually have a locally differing total thickness, depending on the treatment applied onto the at least one thermoplastic porous absorbing layer, in the range of from 10 µm to 230 µm, preferably in the range of 20 to 180 µm, more preferably in the range of 30 to 150 µm.

Optionally the casing can be shirred with conventional technology as known to the person skilled in the art. Alternatively the usage from the reel, in sections or as bags is possible as well.

If the food casing shall be sealed, e.g. to create tubular casings or bags, the food contact layer is formed of a heat-sealable thermoplastic material. If a cut-open tubular film or a flat film shall be sealed to a tube, the layer sequence needs to reflect the needs of the seal to be achieved, i.e. the surfaces to be sealed need to have been formed of a heat-sealable thermoplastic material. Laminated film or cast film can be composed of layers with reduced width in comparison to other layers of the film structure, so that e.g. outer layer(s) can be sealed directly to each other in an overlap seal, e.g. by means of ultrasonic welding. Alternatively, if the outer layers of an embossed flat film cannot be overlap-sealed with a stripe, the film can be laminated to a heat sealable film for turning the flat film into a tubular casing to then seal an additional stripe of the same heat sealable material onto the overlap or with the edges of the film in an edge-to-edge position.

Based on the above properties a coated or impregnated food casing according to the invention can be stuffed with foodstuff, especially with meat products like sausage or ham emulsion or processed cheese or fish products, and transfer the coloring or flavoring functional food additives onto the foodstuff during cooking and/or storage.

The invention will now be described using examples of embodiments and comparative examples, but without limiting the scope of the invention.

Examples

The non-oriented casing of comparative example C1 was produced on a blown film extrusion line with 5 extruders, using the following raw materials:

| PE: | polyethylene: | LLDPE 1004 YB by ExxonMobil |
|---|---|---|
| tie: | modified polyolefin: | Admer NF 518E by Mitsui Chemicals |
| PA6: | polyamide: | 80% Tarnamid T30 by Zaklady Azotowe |
| | | 20% PA 6I/6T Grivory G21 by EMS |

The tubular casing was made by plasticizing and homogenizing the PE, tie and PA6 in the respective extruders as described in table 1 below, the first layer mentioned being the one in contact with the foodstuff. Polyamide based layers had melt temperatures of around 240° C. and polyolefin-based layers and adhesives (=tie) of around 220° C. The 5 melt-flows were coextruded into a tube by using a 5-layer head at 240° C. in which the individual flows were joined in quantitative ratios according to the desired layer thickness of the individual layers and extruded through an annular die. The bubble was air-cooled via the internal air and a cooling ring on the outside. The inside surface of the casing was corona-treated to have a wetting tension of 40 mN/m. The flat width of the tubular casing was 160 mm. The layer thicknesses of the layers from inside to outside were 15 µm PE, 7 µm tie, 20 µm PA, 7 µm tie and 15 µm PA. In a next step the casing was internally coated with the functional additive Hickory Alkalized Smoke by Kerry Ingredients & Flavours using a vertical "moving bubble" between 2 pairs of nip reels, allowing a contact time of 120 s. The pressure of the upper squeezing reel pair was 2 bar.

The Comparative Example C2 was produced like Comparative Example C1, but the PE layer was made porous by the addition of a foaming agent. The layer in contact with the foodstuff had the following composition:

| P1: | Porous 1: | 95 weight-% LLDPE 1004 YB by ExxonMobil |
|---|---|---|
| | | 05 weight-% Ecocell H1 by Clariant |

The layer thicknesses of the layers from inside to outside were 15 µm (not expanded solid content) P1, 7 µm tie, 20 µm PA, 7 µm tie and 15 µm PA. Upon leaving the head, the foaming agent increased the thickness of the layer of P1 to an average of 69 µm. The inside surface of the casing was corona-treated with the same intensity as C1, but because of the porosity the surface tension cannot be evaluated by testing inks. In a next step the porous casing was coated with the functional additive Hickory Alkalized Smoke by Kerry Ingredients & Flavours using a vertical "moving bubble" between 2 pairs of nip reels, allowing a contact time of 120 s. The pressure of the upper squeezing reel pair was 2 bar.

Example 1 according to the invention is made using the uncoated Comparative Example C2 as the original casing and reversing it to have the porous layer on the outside. The flattened tubular casing was embossed for 15 s at 80 bar hydraulic pressure in a hydraulic cylinder of diameter 45 mm between 2 fluoroethylene polymer (PTFE-)coated embossing tools of 280 mm length and 250 mm width, the tools heated to a temperature of approximately 130° C., i.e. above the melting temperature of the porous polyolefin-based food contact layer, but below the melting temperature of the polyamide layer, and capable of embossing a grid of thickness 1 mm and square-shaped mesh-width 17 mm by melting the grid pattern into the porous layer. After the embossing, the thin-embossed grid areas had less opacity in comparison to the porous mesh areas. The embossed casing was reversed again and coated with the functional additive Hickory Alkalized Smoke by Kerry Ingredients & Flavours using a vertical "moving bubble" between 2 pairs of nip reels, allowing a contact time of 120 s. The pressure of the upper squeezing reel pair was 2 bar.

Example 2 according to the invention is made using the uncoated Comparative Example C2 as the original casing. The casing was trimmed along one edge to have an opened flat width of 270 mm. The porous side of the opened casing was embossed for 15 s at 80 bar hydraulic pressure in a hydraulic cylinder of diameter 45 mm by one PTFE-coated embossing tool of 280 mm length and 250 mm width, the tools heated to a temperature of approximately 130° C. and capable of embossing a grid of thickness 1 mm and square-shaped mesh-width 17 mm. The film was positioned with respect to the tool so that 10 mm on both edges of the opened film were not embossed. After the embossing, the thin-embossed grid areas had less opacity in comparison to the porous mesh-areas. The embossed film with the to-be-thermoformed porous square-shaped areas was pre-heated by infra-red heating onto the non-embossed side to a thermoforming temperature of approximately 100° C. In a thermoforming station, while the film was held in place by the upper and lower thermoforming molds' matching grid patterns, the square-shaped areas were drawn by vacuum in the lower mold and air pressure in the upper mold homogeneously into the cavities of the lower mold, which had the shape of—in the direction perpendicular to the plane of the film—overstretched bulges (depth of 10 mm), thus stretching the embossed square-shaped areas by a draw ratio of around 3 to 4. After the thermoforming, the depth of the bulges was reduced by infra-red heating to around 3 to 4 mm. In a next step the embossed and thermoformed film was coated with the functional additive Hickory Alkalized Smoke by Kerry Ingredients & Flavours by spraying, flooding the horizontal embossed and thermoformed film for 1 min. To remove surplus liquid, the film passed a cylinder and was guided upwards in a 45°-angle for 1 min, air blades on the downside of the film preventing that the functional additive is getting onto the downside of the film. After passing a sleeve-covered cylinder with the sleeves negative bulge-topology matching the film's thermoformed topology, the coated, now horizontal film was dried in an air stream of 80° C. The drying was stopped when the functional additive was dry enough to pass the next step. Finally the film was sealed to a tube with the coated side inwards using a 30 μm thick band of Tarnamid T30 (which is a polyamide 6), being sealed to the PA-layer of the non-overlapping non-embossed and non-thermoformed edges of the film by 2 longitudinal ultrasonic welding seams of 1 mm width, having sufficient seal strength to survive the cooking cycle. The casing of Example 2 did not have to be reversed before stuffing.

The oriented casing of Comparative Example C3 was produced on a double-bubble tubular film extrusion line as a 3-layer structure with 3 single-screw extruders, using the following raw materials:

| P2: | Porous 2: | Compound A as described below |
|---|---|---|
| tie: | modified polyolefin: | Bynel 50E571 by Du Pont |
| PA6: | polyamide: | 80% PA 6 Ultramid B 36 SL by BASF |
| | | 20% PA 6I/6T Grivory G21 by EMS |

The Compound A, which is used in P2, was compounded using the following raw materials:
- 63 weight-% polypropylene: MTEGRITY PP100 by M. Holland Company
- 19 weight-% soybean oil: refined IP Ph. Eur. 8.0 by Gustav Heess GmbH
- 8 weight-% glycerin: 99.5% Distilled Glycerine/Pharma grade by Preol, a.s.
- 10 weight-% silica: Hi-Sil ABS-D by PPG Industries For the preparation, in a heatable stirring kettle at a temperature of 50° C. the oil and the glycerin were mixed before adding the silica and mixing until the mixture had become floatable crumbles. These crumbles and the polypropylene were compounded using a ZSK 25 by Werner & Pfleiderer, having 25 mm-screws with a length to diameter ratio of 50. The compound was homogenized at 250 rpm at temperatures of 170 to 230° C. and exited the compounder through a 2×3.5 mm diameter strand die with an output of 12 kg/h. The white strand then was cooled down in a water bath and chopped into granules.

The tubular casing of Comparative Example C3 was made by plasticizing and homogenizing the raw materials in the respective single-screw extruders as described in table 1 below, the first layer mentioned being the one in contact with the foodstuff. Polyamide based layers had melt temperatures of around 255° C. and polyolefin-based layers and adhesives (=tie) around 240° C. The 3 melt-flows were coextruded into a primary tube by using a 3-layer head at 255° C. in which the individual flows were joined in quantitative ratios according to the desired layer thickness of the individual layers and extruded through an annular die. The primary tube was quickly cooled down to about 20° C. and then heated up to about 80° C. to be orientated in an area ratio of 9.24:1. In a further heating zone the generated casing was heat-set so that the thermal shrinkage amounted to 12%. In the 3-layer casing the layer thickness of the outer layer (A) was 42 μm, the layer thickness of the adhesive layer (HV) was 4 μm, and the layer thickness of the inner layer (P) was 34 μm. The shrinkage of the casing after 15 min in water of 80° C. was 20% in machine direction and 19% in transversal direction. The flat width of the tubular casing was 160 mm. In a next step the casing was coated with the functional additive SmokEz Cherrywood Poly2515 by Red Arrow using a vertical "moving bubble" between 2 pairs of nip reels, allowing a contact time of 300 s. The pressure of the upper squeezing reel pair was 2 bar.

Example 3 according to the invention is made using the uncoated Comparative Example C3 as the original casing. To melt the grid pattern into the porous layer, the casing was inflated for 3 s by air pressure of 0.4 bar between 2 FEP-coated embossing tools, which were heated to 165° C. and 20 mm apart, each embossing tool of 280 mm length and 250 mm width being capable of embossing a grid of thickness 1 mm and square-shaped mesh-width 17 mm by melting the grid pattern into the porous layer. Where the casing came into contact with the embossing tools, the casing had a reduced opacity, showing that the porosity partially collapsed when the matrix fused. In a next step the thermally treated casing was coated with the functional additive SmokEz Cherrywood Poly2515 by Red Arrow using a vertical "moving bubble" between 2 pairs of nip reels, allowing a contact time of 300 s. The pressure of the upper squeezing reel pair was 2 bar.

The oriented casing of Comparative Example C4 was produced on a double bubble tubular film extrusion line as a 5-layer structure with 5 single-screw extruders, using the following raw materials:

| P3: | Porous 3: | 73 weight-% Flexirene CL 10U by Polimeri Europa |
|---|---|---|
| | | 27 weight-% LLDPE-based masterbatch with |

-continued

| | | |
|---|---|---|
| tie: | modified polyolefin: | 40 weight-% talc by Performance Compounding 6.356 g/h Nitrogen 4.0 (99.99%) by Linde Gas Admer NF 518E by Mitsui Chemicals |
| PE: | polyehtylene: | Flexirene CL 10U by Polimeri Europa |
| PA6: | polyamide: | 95% PA 6 Akulon F136C by DSM 05% PA 6I/6T Grivory G21 by EMS |

The tubular casing of Comparative Example C4 was made by plasticizing and homogenizing the raw materials in the respective single-screw extruders as described in table 1, the first layer mentioned being the one in contact with the foodstuff. Polyamide-containing layers had melt temperatures of around 250° C. and polyolefin-based layers and adhesives (=tie) around 230° C. The dosing system for the injection of the supercritical pore-forming agent nitrogen was linked to the extruder feeding the porous inner layer. The 5 melt-flows were coextruded into a primary tube by using a 5-layer head at 250° C. in which the individual flows were joined in quantitative ratios according to the desired layer thickness of the individual layers and extruded through an annular die. The primary tube was quickly cooled down to about 20° C. and then heated up to about 80° C. to be orientated in an area ratio of 8.0:1. In a further heating zone the generated casing was heat-set so that the thermal shrinkage after 1 min in water at 80° C. amounted to 15% in both directions. In the 5-layer casing the layer thickness of the polyamide outer layer was 30 μm, the layer thickness of the tie layers was 2.5 m each, the layer thickness of the polyethylene core layer was 10 μm and the layer thickness of the inner layer (P3) was 55 μm. The flat width of the tubular casing was 160 mm. In a next step the casing was coated with the functional additive Hickory Alkalized Smoke by Kerry Ingredients & Flavours using a vertical "moving bubble" between 2 pairs of nip reels, allowing a contact time of 120 s. The pressure of the upper squeezing reel pair was 2 bar.

Example 4 according to the invention is made using the uncoated Comparative Example C4 as the original casing. To melt the grid pattern into the porous layer, the casing was inflated for 10 s by air pressure of 0.2 bar between 2 Teflon-coated embossing tools, which were heated to 130° C. and 20 mm apart, each embossing tool of 280 mm length and 250 mm width being capable of embossing a grid of thickness 1 mm and square-shaped mesh-width 17 mm by melting the grid pattern into the porous layer. Where the casing came into contact with the embossing tools, the casing had a reduced opacity, showing that the porosity partially collapsed when the matrix fused. In a next step the thermally treated casing was coated with the functional additive Hickory Alkalized Smoke by Kerry Ingredients & Flavours using a vertical "moving bubble" between 2 pairs of nip reels, allowing a contact time of 120 s. The pressure of the upper squeezing reel pair was 2 bar.

The oriented casing of Comparative Example C5 was produced as C4, but using the following raw materials for the porous layer:

| | | |
|---|---|---|
| P4: | Porous 4: | 75 weight-% Admer NF 518E by Mitsui Chemicals 05 weight-% LLDPE-based masterbatch with 40 weight-% talc by Performance Compounding 20 weight-% PA 6 Akulon F136C by DSM 7.718 g/h Nitrogen 4.0 (99.99%) by Linde Gas |

In the 5-layer casing the layer thickness of the polyamide outer layer was 30 μm, the layer thickness of the tie layers was 2.5 μm each, the layer thickness of the polyethylene core layer was 10 μm and the layer thickness of the inner layer (P4) was 65 μm. The casing was coated with the functional additive Hickory Alkalized Smoke by Kerry Ingredients & Flavours using a vertical "moving bubble" between 2 pairs of nip reels, allowing a contact time of 120 s. The pressure of the upper squeezing reel pair was 2 bar.

Example 5 according to the invention is made using the uncoated Comparative Example C5 as the original casing and treating it as Example 4 except for using the embossing tools at a temperature of 150° C. The thermally treated casing was coated with the functional additive Hickory Alkalized Smoke by Kerry Ingredients & Flavours using a vertical "moving bubble" between 2 pairs of nip reels, allowing a contact time of 120 s. The pressure of the upper squeezing reel pair was 2 bar.

Thus, for comparison purposes the original casings of the examples were coated and evaluated without previously submitting them to a thermal embossing and/or thermoforming step. Comparison example C1 is the comparison example C2 without chemical foaming agent in the food contact layer; comparison example C2 is the original casing of example 1 and 2; comparison example C3, C4 and C5 are the original casings of example 3, 4 and 5, respectively.

Table 1 gives an overview of the examples prepared.
Sample Evaluation

The examples were characterized using the following evaluation methods:

Total Wall Thickness of an Area Having a Non-Reduced Average Layer Thickness of the at Least One Porous Absorbing Layer (TWT n-r PL)

The non-treated areas of the casing are the areas having a non-reduced average thickness of the at least one porous absorbing layer. If the casing is only embossed, the non-treated areas of the casings of the invention have a higher opacity than the treated areas, so that these areas can be visually detected and marked against a light source such as an x-ray viewer or another contrasting background. If the casing is printed on the outside surface of the outer bulk layer, the printing inks may need to be removed by an adequate method, e.g. by applying a solvent to the ink. Along the circumference of the casing 10 locations with the visually highest opacity were marked on the outside surface of the outermost bulk layer with a permanent marker, marking the locations having a non-reduced layer thickness to be analyzed. No pair of the 10 locations is in the same line in machine direction. In addition, when the topology of the surface allows it, the 10 locations of the area having a non-reduced layer thickness shall each be chosen in such a way that in the direction of the extrusion line an embossed area is close enough to have both areas, i.e. with non-reduced and with reduced layer thickness, cut in one thin-section for the analysis of the bulk layer thickness at this location. After storing the sample for 1 day at the testing conditions of 23° C. and 50% r.h., the total wall thickness at these 10 locations is measured according to DIN 53370: 2006-11 method F (for embossed films) by means of a thickness gauge, having a measurement surface diameter of 8 mm and a contact pressure of 20 kPa. As the porous layers may show viscoelastic deformation under pressure, the reading after 1 second of contact is taken as the total wall thickness.

If the casing is thermoformed, the thermoformed areas can be noted as areas leaving the plane of the film when the opened tubular casing is placed with its outside surface of the at least one porous absorbing layer flat against a flat surface. Depending on the pore dimensions of the non-treated casing, the thermoformed areas can have a higher opacity or a lower opacity than the non-treated areas of non-reduced layer thickness. The areas of non-reduced layer thickness, to be marked for evaluation of the total wall thickness, are selected from the locations of highest opacity, which are in the plane of the film, i.e. are not thermoformed.

As the thickness gauge as described above with a tip of 8 mm may not be suitable for the thickness measurement of a non-treated location within thermoformed areas, in case that the casing is thermoformed, the areas having a non-reduced layer thickness are being made accessible—after storing the sample for 1 day at the testing conditions of 23° C. and 50% r.h.—by cutting 5 mm wide stripes with the marked locations contained in the stripes. By means of a thickness gauge with contact force 0.5 N according to DIN 53370:2006-11 method P the total wall thickness of an area having a non-reduced average layer thickness of the at least one porous absorbing layer is measured. As the porous layers may show viscoelastic deformation under pressure, the reading after 1 second of contact is taken as the total wall thickness.

Total Wall Thickness of an Area Having a Reduced Average Layer Thickness of the at Least One Porous Absorbing Layer (TWT r PL)

When the casing is embossed, the embossed areas of the casing are areas of reduced average layer thickness of the at least one porous absorbing layer. Generally speaking, the embossed areas of the casings of the invention have a lower opacity than the non-treated areas, so that these areas can be visually detected and marked against a light source such as an x-ray viewer or another contrasting background. If the casing is printed on the outside surface of the outer bulk layer, the printing inks may need to be removed by an adequate method, e.g. by applying a solvent to the ink. 10 locations of least visual opacity, i.e. highest transparency, are selected for measurements, considering the above mentioned closeness to the locations of non-reduced average layer thickness of the at least one porous absorbing layer. In the case of an embossed casing it is advisable to start the selection of to-be-evaluated locations in the areas having reduced average layer thickness of the at least one porous absorbing layer and then select neighboring locations of non-reduced average layer thickness of the at least one porous absorbing layer in machine direction.

If the area of embossing according to this invention is too small for a measurement according to DIN 53370:2006-11 method F (for embossed films), then the evaluation shall take place under a light or optical microscope as described below for the determination of the bulk layer(s) layer thickness.

In case that the casing has been thermoformed, the total wall thickness of the areas of reduced average layer thickness of the at least one porous absorbing layer are determined—after storing the sample for 1 day at the testing conditions of 23° C. and 50% r.h.—along the longest thermoformed contour of 10 different thermoformed areas a 5 mm wide stripe is cut. By means of a thickness gauge with contact force 0.5 N according to DIN 53370:2006-11 method P and scanning with multiple measurements for the lowest total wall thickness, the location of the lowest total wall thickness of the area of high retaining capacity is determined and the total wall thickness measured. As the porous layers may show viscoelastic deformation under pressure, the reading after 1 second of contact is taken as the total wall thickness.

Bulk Layer(s) Layer Thickness at Locations of Non-Reduced and Reduced Layer Thickness of the at Least One Porous Absorbing Layer (BL LT n-r PL and BL LT r PL, Respectively)

All locations of layer thickness measurements are marked on the non-porous outside surface of the casing with a permanent marker, so that the same location can be evaluated under a light or optical microscope in a suitable magnification and contrast. The thickness of the at least one non-porous layer (=bulk layers) at the locations marked for the determination of the layer thickness was determined on 20 μm-thick thin-sections, cut with a RM 2245 microtome by Leica and analyzed with a BX51 microscope by Olympus, using a magnification of 10×40 in light transmission mode.

In case that the casing cannot be cut without separation of the thin-section, a cryo-microtome may be helpful and/or the sample may be embedded in curing resin prior to cutting.

Porous Layer(s) Layer Thickness at Locations of Non-Reduced and Reduced Layer Thickness of the at Least One Porous Absorbing Layer (PL LT n-r PL and PL LT r PL, Respectively)

The layer thickness of the at least one porous absorbing layer is determined as the difference between the total wall thickness of the casing at the analyzed location (TWT n-r PL and TWT r PL, respectively) and the thickness of the at least one bulk layer (BL LT n-r PL and BL LT rPL, respectively) at the same location.

For one average thickness of the at least one thermoplastic porous absorbing layer in the area of non-reduced or reduced layer thickness, the average of the PL WT values, determined for the 10 areas each of non-reduced and of reduced layer thickness by embossing and by thermoforming, respectively, were separately calculated. If the casing was embossed and thermoformed, the smallest average layer thickness of the at least one thermoplastic porous absorbing layer is taken and used for calculating the difference of the average layer thickness of the at least one thermoplastic porous absorbing layer in areas having a non-reduced average layer thickness and areas having a reduced average layer thickness of the at least one thermoplastic porous absorbing layer.

Retaining Capacity Ratio (RCR)

For the retaining capacity ratio of each evaluated location, the ratio of the layer thickness of the at least one porous absorbing layer, calculated as the difference between total wall thickness and bulk layer(s) layer thickness, over the thickness of the at least one bulk layer at the same location is calculated.

From the 10 RC values each per area having a non-reduced average layer thickness, area having a reduced average layer thickness by embossing and/or area having a reduced average layer thickness by thermoforming, the respective average RCR value is calculated. The Retaining Capacity Difference (RCD) between areas of high retaining capacity and areas of low retaining capacity was calculated as the absolute difference between the highest average RCR value and the lowest average RCR value and given as the Retaining Capacity Difference of the example in % of the average retaining capacity ratio of the areas having the lowest average retaining capacity ratio of the sample.

Coating Weight

The coating weight was evaluated by measuring the weight of porous layer internal tubular casing (i.e. example 2 sealed uncoated) before and after impregnation with liquid smoke (depending on example with smoke type Hickory Teepak Alkalized Smoke by Kerry Ingredients & Flavours or with SmokEz Cherrywood Poly2515 by Red Arrow). 1000 mm casing length was cut, the average flat width was calculated from 3 measurements with a ruler to 0.5 mm at both ends and in the center of the piece, and the weight was measured on a scale (for a maximum weight of 420 g with d=0.001 g by Satorius). Then the casing was closed on one end with adhesive tape and filled with the liquid smoke, so that—during flat horizontal storage on a table—the entire inside surface was in contact with the liquid smoke for 2 min or 5 min, as was the contact time in the preparation of the sample. After emptying the casing, the adhesive tape at its end was removed, the piece was taped to a carrier film and squeezed out by a pair of nip reels at a pressure of 2 bar, After squeeze-out the piece was removed from the carrier film and weighed again. The coating weight in g/m$^2$ was calculated as the difference of the two weight measurements per surface area of the casing as given by casing length times twice the average flat width.

For one value of the coating weight, 3 measurements were carried out and the average value was calculated.

Bulge Height

For the determination of the bulge height of the final un-peeled sausage a caliper ruler with d=0.1 mm was used. 5 slices of 50 mm width were cut from the cooked and cooled sausage. The core of each slice was cut out circularly in such a way, that a cylindrical ring of approximately 5 mm thickness plus the depth of possible bulges and 50 mm width remained. The ring was cut open and was placed flat onto a table surface. A rectangular cuboid-shaped glass plate of 10 cm×10 cm×1.3 mm (weight=31 g) was placed across at least 3 bulges and the distance between the base between two bulges and the upper surface of the glass plate was measured with the calliper ruler. The bulge height is the measured distance minus the thickness of the glass plate. 2 locations per slice were measured, and from the 10 measurements one average value was calculated.

Additive Barrier

For the evaluation of the additive barrier, the surface of the cooked unpeeled sausage was wiped off with a white paper cloth. Any transfer of functional additive through the casing was noted. "Outside clean" means that a color change of the white paper cloth was visually not detected.

Surface Pattern after Cooking

Bologna-type sausages were prepared by stuffing meat emulsion into the impregnated sample material, cooking the sausages in a cooking chamber at 76° C. for 2 hours and cooling them down over night to 3° C. in a cooling chamber. The transferred pattern of functional additive on the surface of the peeled final sausage was visually evaluated as visibility of a lighter grid pattern versus darker non-grid areas on a scale from 0 (=grid pattern not visible) via 1 (=grid pattern slightly visible) and 2 (=grid pattern well visible) to 3 (=grid pattern strongly visible).

Table 1 shows the results of the evaluated properties.

TABLE I

EXAMPLE STRUCTURE AND EVALUATION

| # | Example Structure in/core/out | Pores | Orient-ed | Em-boss-ed | Ther-mo-formed | Input orig. TWT μm | orig. BL LT μm | Treat-ment | Averages reduced PL LT r PL TWT μm | r PL BL LT μm | PL LT μm | r PL RCR |
|---|---|---|---|---|---|---|---|---|---|---|---|---|
| C1 | PE/tie/PA6/tie/PA6 | no | no | no | no | 64 | 49 | none | 61 | 47 | 14 | 0,30 |
| C2 | p1/tie/9A6/tie/PA6 | yes | no | no | no | 118 | 49 | none | 114 | 46 | 68 | 1,46 |
| 1 | p1/tie/PA6/tie/PA6 | yes | no | yes | no | | | Emb. | 81 | 48 | 33 | 0,69 |
| 2 | pl/tie/PA6/tie/PA6 | yes | no | yes | yes | | | Emb. | 82 | 48 | 34 | 0,70 |
| | | | | | | | | Th.fo. | 92 | 33 | 59 | 1,79 |
| C3 | p2/tie/PA6 | yes | yes | no | no | 78 | 46 | none | 76 | 44 | 31 | 0,71 |
| 3 | p2/tie/PA6 | yes | yes | yes | no | | | Emb. | 64 | 45 | 18 | 0,41 |
| C4 | p3/tie/PE/tie/PA6 | yes | yes | no | no | 100 | 45 | none | 95 | 43 | 52 | 1,22 |
| 4 | p3/tie/PE/tie/PA6 | yes | yes | yes | no | | | Emb. | 58 | 44 | 14 | 0,33 |
| C5 | p4/tie/PE/tie/PA6 | yes | yes | no | no | 110 | 45 | none | 105 | 43 | 62 | 1,43 |
| 5 | p4/te/PE/tie/PA6 | yes | yes | yes | no | | | Emb. | 65 | 45 | 20 | 0,45 |

| # | Averages non-red. PL LT n-r PL TWT μm | n-r PL BL LT μm | n-r PL PL LT μm | n-r PL RCR | Differences max D PL LT μm | Redu. PL LT % | RCD % | Coating weight coating g/m$^2$ | height bulge mm | additive barrier | Kitchen Test visible pattern 3 = strong 0 = no; |
|---|---|---|---|---|---|---|---|---|---|---|---|
| C1 | 67 | 52 | 15 | 0,28 | 1 | 5 | 5 | 2 | no bulges | outside clean | 0 |
| C2 | 123 | 53 | 70 | 1,33 | 3 | 4 | 9 | 20 | no bulges | outside clean | 0 |
| 1 | 125 | 50 | 75 | 1,49 | 42 | 56 | 115 | 19 | no bulges | outside clean | 1 |
| 2 | 124 | 49 | 75 | 1,54 | 41 | 55 | 157 | 29 | 2,1 | outside clean | 3 |
| C3 | 81 | 48 | 33 | 0,69 | 2 | 6 | 2 | 10 | no bulges | outside clean | 0 |
| 3 | 82 | 48 | 34 | 0,70 | 16 | 46 | 74 | 10 | no bulges | outside clean | 2 |
| C4 | 105 | 48 | 57 | 1,20 | 5 | 9 | 1 | 34 | no bulges | outside clean | 0 |
| 4 | 107 | 47 | 60 | 1,27 | 45 | 76 | 286 | 33 | no bulges | outside clean | 3 |
| C5 | 115 | 47 | 68 | 1,45 | 6 | 9 | 1 | 28 | no bulges | outside clean | 0 |
| 5 | 116 | 46 | 70 | 1,53 | 50 | 71 | 236 | 28 | no bulges | outside clean | 3 |

The samples of comparative example C1 and C2 did not show bulging nor a net pattern. In C1 the little smoke remaining inside the coated casing transferred in very irregular light stripes as most of the liquid smoke was squeezed out by the nip reels and the remaining liquid moved to folds, from where the liquid transferred to the meat. C2, C3, C4 and C5 transferred the smoke homogeneously, without showing a net pattern.

On the contrary, the examples according to the invention show a good additive transfer, not allowing the transferable functional additive to migrate to the outside. Most importantly, there is a distinct difference in color between the darker non-grid areas and the brighter color of the grid location. Comparing Example 4 and 5, the Example 5 showed more cling to the sausage surface upon peeling than Example 4.

After cooking, the thermoformed bulges of example 2 still had height remaining to help enhance the resemblance of a sausage product cooked in a net. The resulting porosity increase and the liquid smoke retained in the bulges did achieve a significant darkening of the sausage surface in the non-grid areas over the embossed grid areas.

The examples according to the invention could be stuffed and cooked without breakages. The examples according to the invention showed a homogeneous intense transfer of the functional additive in the non-grid areas, leaving the grid lighter in contrast to the unsatisfactory or non-patterned transfer of the comparative examples. The coating weight was not significantly changed by the embossing/fusing treatment for creating the grid in examples 1, 3, 4 and 5.

The examples according to the invention show a good to excellent local retaining capacity for liquids. Depending on the raw materials used and the realized deformation, the retaining capacity can be defined in a wide range.

As described above, alternatively hydrophilic substances can be incorporated into the barrier layers to increase the water transmission of the casing according to the invention or they can be incorporated into the at least one porous absorbing layer to increase the absorption of the transferable functional additive.

To sum up, the examples show that the casings according to the invention combine retaining capacity, transfer capability, non-permeability to the functional additives, selective coloration and texture typical of a net-cooked product, versatility in the pattern design, and reliable mechanical properties.

The invention claimed is:

1. A multi-layered (co)extruded thermoplastic food casing comprising:
   at least one thermoplastic porous absorbing layer; and
   at least one layer having a barrier effect for water vapor and/or oxygen,
   wherein said at least one layer having a barrier effect for water vapor and/or oxygen has an average layer thickness in a range of from 5 to 60 µm over the entire surface area,
   wherein said at least one thermoplastic porous absorbing layer comprises as a main component at least one thermoplastic polymer material selected from the group consisting of (co)polyamides and (co)polyolefins,
   wherein said at least one thermoplastic porous absorbing layer comprises areas having a reduced average layer thickness and areas having a non-reduced average layer thickness,
   wherein the average layer thickness of said at least one thermoplastic porous absorbing layer in areas having a non-reduced average layer thickness is in a range of from 10 to 200 µm,
   wherein the average layer thickness in areas having a reduced average layer thickness is lower by 7 to 140 µm and is reduced by a range of from 30 to 85% compared to said areas having a non-reduced average layer thickness of the at least one thermoplastic porous absorbing layer, and
   wherein both areas having a reduced average layer thickness and a non-reduced average layer thickness comprise pores which are able to absorb a functional additive.

2. The multi-layered (co)extruded thermoplastic food casing according to claim 1, wherein said multi-layered (co)extruded thermoplastic food casing comprises as an inner layer said at least one thermoplastic porous absorbing layer which comprises a (co)polyolefin as a main component said (co)polyolefin, wherein the surface of an innermost thermoplastic porous absorbing layer of said at least one porous absorbing layer is adjacent to food to be enclosed therein, said thermoplastic porous absorbing layer further comprising at least 5 weight-% of a (co)polyamide based on the weight of the thermoplastic polymer material used for forming said at least one thermoplastic porous absorbing layer, wherein the at least one thermoplastic porous absorbing layer comprises a filler in an amount of 0.1 to 15 weight-%.

3. The multi-layered (co)extruded thermoplastic food casing according to claim 1, which is a seamless, tubular multi-layered coextruded thermoplastic food casing comprising the thermoplastic polymer material in said at least one thermoplastic porous absorbing layer in a weight ratio of at least 55 weight-% based on the weight of the thermoplastic polymer material used for forming said at least one thermoplastic porous absorbing layer.

4. The multi-layered (co)extruded thermoplastic food casing according to claim 1, wherein the average layer thickness of said at least one porous absorbing layer in said areas having a reduced average layer thickness is reduced by 10 to 90 µm and 35 to 75%, preferably by 15 to 60 µm and 40 to 70%, compared to said areas having a non-reduced average layer thickness.

5. The multi-layered (co)extruded thermoplastic food casing according to claim 1, wherein the average layer thickness of said at least one thermoplastic porous absorbing layer in areas having a non-reduced average layer thickness is in a range of from 15 to 130 µm, and wherein the average layer thickness in areas having a reduced average layer thickness is lower by 8 to 60 µm and is reduced by a range of from 55 to 70% compared to said areas having a non-reduced average layer thickness of the at least one thermoplastic porous absorbing layer.

6. The multi-layered (co)extruded thermoplastic food casing according to claim 1, wherein the at least one thermoplastic polymer material selected from the group consisting of (co)polyamides and (co)polyolefins, is present in said at least one thermoplastic porous absorbing layer in a weight ratio of at least 80 weight-%, based on the weight of the thermoplastic polymer material used for forming said at least one thermoplastic porous absorbing layer.

7. The multi-layered (co)extruded thermoplastic food casing according to claim 1, wherein the porosity of said at least one porous absorbing layer has been generated by coextruding a polymer composition comprising a supercritical pore-forming agent.

8. The multi-layered (co)extruded thermoplastic food casing according to claim 1, wherein the food casing is free of any non-supercritical pore-forming agent.

9. The multi-layered (co)extruded thermoplastic food casing according to claim 1, wherein as thermoplastic material a (co)polyamide is used.

10. The multi-layered (co)extruded thermoplastic food casing according to claim 1, wherein said at least one thermoplastic porous absorbing layer is free of any liquid pore-forming agent.

11. A method for producing a multi-layered (co)extruded thermoplastic food casing as defined in claim 1, comprising a step of subjecting the (co)extruded casing to a mechanical and/or thermal treatment so as to create in the said at least one porous absorbing layer a patterned retaining capacity, followed by a coating step and an optional drying step and an optional subsequent reversing step of turning the casing inside out if the at least one porous absorbing layer had been on the outside.

12. The method for producing a multi-layered (co)extruded thermoplastic food casing according to claim 11, further comprising a step of subjecting the coextruded or laminated casing in the state of a flat film to at least one mechanical and/or thermal treatment so as to create on its at least one porous absorbing layer a patterned retaining capacity, coating this food contact side with a functional additive followed by an optional drying step and a subsequent sealing step to create a tubular casing with the coated functional additive inside.

13. The method for preparing a multi-layered (co)extruded thermoplastic food casing according to claim 11, further comprising an embossing step, which takes place in the thermoplastic state of the material of the food contact layer to create a textured surface on the food contact surface of the (co)extruded thermoplastic food casing.

14. The method for preparing a multi-layered (co)extruded thermoplastic food casing according to claim 11, further comprising the step of subjecting the multi-layered (co)extruded thermoplastic food casing to a mono-axial or bi-axial orientation treatment prior to a step of forming a textured surface on the food casing.

* * * * *